(12) United States Patent
Wallace et al.

(10) Patent No.: US 6,652,743 B2
(45) Date of Patent: Nov. 25, 2003

(54) SYSTEM AND METHOD FOR REMOVING POLLUTANTS FROM WATER

(75) Inventors: Scott D. Wallace, Marine on St. Croix, MN (US); Paul E. Lambrecht, Grey Eagle, MN (US)

(73) Assignee: North American Wetland Engineering, Inc., Forest Lake, MN (US)

( * ) Notice: Subject to any disclaimer, the term of this patent is extended or adjusted under 35 U.S.C. 154(b) by 0 days.

(21) Appl. No.: 10/059,097

(22) Filed: Jan. 26, 2002

(65) Prior Publication Data

US 2003/0024874 A1 Feb. 6, 2003

Related U.S. Application Data

(63) Continuation-in-part of application No. 09/617,880, filed on Jul. 17, 2000, which is a continuation-in-part of application No. 09/103,075, filed on Jun. 23, 1998, now Pat. No. 6,200,469.
(60) Provisional application No. 60/050,533, filed on Jun. 23, 1997.

(51) Int. Cl.[7] .................................................. C02F 3/00
(52) U.S. Cl. ........................ 210/170; 210/196; 210/220
(58) Field of Search ................................ 210/170, 196, 210/220

(56) References Cited

U.S. PATENT DOCUMENTS

| 584,886 A | 6/1897 | Mead |
|---|---|---|
| 681,881 A | 9/1901 | Monjeau |
| 2,306,027 A | 12/1942 | Swaney |
| 2,486,512 A | 11/1949 | Armstrong |
| 3,429,806 A | 2/1969 | Carter et al. |
| 3,662,890 A | 5/1972 | Grimshaw |
| 3,770,623 A | 5/1972 | Seidel |
| 3,894,355 A | 7/1975 | Carothers |
| 3,925,206 A | 12/1975 | Dea |
| 3,957,642 A | 5/1976 | Oldham et al. |
| 4,002,561 A | 1/1977 | Traverse |
| 4,039,451 A | 8/1977 | Smith |

(List continued on next page.)

FOREIGN PATENT DOCUMENTS

| CA | 1 304 176 | 6/1993 |
|---|---|---|
| CA | 2 164 682 | 9/1999 |
| CA | 2 088 469 | 8/2001 |
| DE | 3244787 | 6/1984 |
| DE | 300 015 A7 | 5/1992 |
| DE | 41 19 835 A1 | 12/1992 |
| EP | 0 062 492 A2 | 10/1982 |
| EP | 260187 | 3/1988 |
| EP | 1 132 462 A1 | 9/2001 |
| JP | 3052696 | 3/1991 |
| WO | WO 98/58881 | 12/1998 |

OTHER PUBLICATIONS

*Onsite Wastewater Treatment and Disposal Systems*, Design Manual, U.S. Environmental Protection Agency, pp. 327; 332–333; Oct. 1980.

*Design and Performance of PVC Dosing Siphons*, Mote et al., Transactions of the American Society of Agricultural Engineers, vol. 26, No. 3, pp. 809–813;1983.

(List continued on next page.)

Primary Examiner—Chester T. Barry
(74) Attorney, Agent, or Firm—Patterson, Thuente, Skaar & Christensen, P.A.

(57) ABSTRACT

A system and method for removing pollutants from wastewater. The system includes a constructed wetland cell in which the filtered wastewater is flowed generally vertically. The flow of wastewater is unsaturated through the wetland cell to aerate the wastewater. The wastewater may be further aerated by a blower or injector. The treated wastewater from the wetland cell is blended with untreated wastewater, then either recirculated through the wetland cell or conveyed to a disposal system.

35 Claims, 14 Drawing Sheets

U.S. PATENT DOCUMENTS

| | | |
|---|---|---|
| 4,057,933 A | 11/1977 | Enyeart |
| 4,100,073 A | 7/1978 | Hopcroft |
| 4,123,800 A | 10/1978 | Mazzei |
| 4,169,050 A | 9/1979 | Serfling et al. |
| 4,213,318 A | 8/1980 | Niimi et al. |
| 4,331,538 A | 5/1982 | Kickuth |
| 4,333,837 A | 6/1982 | Plosz et al. |
| 4,415,450 A | 11/1983 | Wolverton |
| 4,439,323 A | 5/1984 | Ball |
| 4,793,929 A | 12/1988 | Kiluth et al. |
| 4,808,535 A | 2/1989 | Isbister |
| 4,826,601 A | 5/1989 | Spratt et al. |
| 4,839,051 A | 6/1989 | Higa |
| 4,855,040 A | 8/1989 | Kickuth |
| 4,872,985 A | 10/1989 | Dinges |
| 4,892,658 A | 1/1990 | Martin et al. |
| 4,904,593 A | 2/1990 | Sugiki et al. |
| 4,962,613 A | 10/1990 | Nalbandian |
| 4,995,969 A | 2/1991 | LaVigne |
| 4,997,568 A | 3/1991 | Vandervelde et al. |
| 5,017,040 A | 5/1991 | Mott |
| 5,050,341 A | 9/1991 | Breezer et al. |
| 5,078,882 A | 1/1992 | Northrop |
| 5,087,353 A | 2/1992 | Todd et al. |
| 5,114,081 A | 5/1992 | Takenaka |
| 5,156,741 A | 10/1992 | Morrison et al. |
| 5,174,897 A | 12/1992 | Wengrzynek |
| 5,205,935 A | 4/1993 | Ruocco |
| 5,264,120 A | 11/1993 | Graves |
| 5,273,653 A | 12/1993 | Kikuth |
| 5,360,517 A | 11/1994 | Guerineau et al. |
| 5,389,257 A | 2/1995 | Todd et al. |
| 5,429,679 A | 7/1995 | Young, Jr. |
| 5,437,786 A | 8/1995 | Horsley et al. |
| 5,454,949 A | 10/1995 | Davis et al. |
| 5,472,472 A | 12/1995 | Northrop |
| 5,496,723 A | 3/1996 | Murzakov et al. |
| 5,534,147 A | 7/1996 | Kallenbach et al. |
| 5,549,817 A | 8/1996 | Horsley et al. |
| 5,582,716 A | 12/1996 | Nurse, Jr. |
| 5,591,331 A | 1/1997 | Nurse, Jr. |
| 5,593,584 A | 1/1997 | Nurse, Jr. |
| 5,599,443 A | 2/1997 | Yamasaki et al. |
| 5,601,236 A | 2/1997 | Wold |
| 5,613,773 A | 3/1997 | Scott et al. |
| 5,647,986 A | 7/1997 | Nawathe et al. |
| 5,674,312 A | 10/1997 | Mazzei |
| 5,676,828 A | 10/1997 | Kallenbach et al. |
| 5,683,577 A | 11/1997 | Nurse, Jr. |
| 5,690,827 A | 11/1997 | Simmering et al. |
| 5,733,453 A | 3/1998 | DeBusk |
| 5,762,801 A | 6/1998 | Jöonsson et al. |
| 5,770,081 A | 6/1998 | McKinney |
| 5,785,258 A | 7/1998 | Akin et al. |
| 5,863,433 A | 1/1999 | Behrends |
| 5,876,484 A | 3/1999 | Raskin et al. |
| 5,893,641 A | 4/1999 | Garcia |
| 5,897,777 A | 4/1999 | Zoeller et al. |
| 5,906,745 A | 5/1999 | Eto |
| 5,910,514 A | 6/1999 | Greenberg et al. |
| 5,951,866 A | 9/1999 | Grove et al. |
| 5,951,922 A | 9/1999 | Mazzei |
| 5,993,649 A | 11/1999 | DeBusk et al. |
| 6,000,418 A | 12/1999 | Kern, Jr. et al. |
| 6,004,463 A | 12/1999 | Swett |
| 6,068,773 A | 5/2000 | Sheaffer |
| 6,076,955 A | 6/2000 | Wallther |
| 6,126,827 A | 10/2000 | Johnson, Jr. |
| 6,159,371 A | 12/2000 | Dufay |
| 6,200,469 B1 | 3/2001 | Wallace |
| 6,264,838 B1 | 7/2001 | Nivens, Jr. |
| 6,277,274 B1 | 8/2001 | Coffman |
| 6,406,627 B1 | 6/2002 | Wallace |

OTHER PUBLICATIONS

*Wetland Vegetation*, Guntenspergen et al. IN Constructed Wetlands for Wastewater Treatment: Municipal, Industrial, and Agricultural, Lewis Publishers, Inc., Chapter 5, pp. 73–88; 1989.

*Integrated Wastewater Treatment Using Artificial Wetlands: A Gravel Marsh Case Study*, Gersberg et al. IN Constructed Wetlands for Wastewater Treatment: Municipal, Industrial, and Agricultural, Lewis Publishers, Inc., Chapters 10, pp. 145–152; 1989.

*Configuration and Substrate Design Considerations for Constructed Wetlands Wastewater Treatment*: Steiner et al. IN Constructed Wetlands for Wastewater Treatment: Municipal, Industrial, and Agricultural, Lewis Publishers, Inc., Chapter 29, pp. 363–367; 1989

*Domestic Wastewater Treatment Using Emergent Plants Cultured in Gravel and Plastic Substrates*, Burgoon et al. IN Constructed Wetlands for Wastewater Treatment: Municipal, Industrial, and Agricultural, Lewis Publishers, Inc., Chapter 38f, pp. 536–541; 1989.

*General Design, Construction, and Operation Guidelines: Constructed Wetlands Wastewater Treatment Systems for Small Users Including Individual Residences*, 2d Ed. Technical Support Series, Water Management Resources Group, Tennessee Valley Authority, pp. 29–30; May 1993.

*Pilot–Scale Nitrification Studies Using Vertical–Flow and Shallow Horizontal–Flow Constructed Wetland Cells*, Watson et al., IN Constructed Wetlands for Water Quality Improvement, CRC Press, Inc., Chapter 31, pp. 301–302, 312; 1993.

*Phosphorus Removal from Wastewater in a Constructed Wetland*, Davies et al., IN Constructed Wetlands for Water Quality Improvement, CRC Press, Inc., Chapter 32, pp. 315–320; 1993.

*Macrophyte–Mediated Oxygen Transfer in Wetlands: Transport Mechanisms and Rates*, Brix, IN Constructed Wetlands for Water Quality Improvement, CRC Press, Inc., Chapter 41, pp. 391–398; 1993.

*Species–Specific Aeration of Water by Different Vegetation Types in Cosntructed Wetlands*, Stengel, IN Constructed Wetlands for Water Quality Improvement, CRC PRess, Inc., Chapter 45, pp. 427–434; 1993

*Application of Constructed Wetlands to Treat Wastewaters in Australia*, Davies, et al., IN Constructed Wetlands for Water Quality Improvement, CRC Press, Inc., Chapter 64, pp. 577–584; 1993.

*Michigan Criteria for Subsurface Sewage Disposal*, Michigan Department of Public Health, pp. 5 & 14, Apr. 1994.

*Sewage Waste Amendment Marsh Process Project (S.W.A.M.P.)*, The Friends of Fort George, Interim Report, 163 pp.; Sep. 1995.

SWAMP Pilot Scale Wetlands –Design and Performance, Lemon et al., The Friends of Fort George, pp. 1–19 & Appendix; Jun. 1996.

*Reciprocating Subsurface–flow Constructed Wetlands for Removing Ammonia, Nitrate, and Chemical Oxygen Demand: Potential for Treating Domestic, Industrial and Agricultural Wastewaters*, Behrendset et al., Water Environment Federation, pp. 251–262; 1996.

*Compact Biofilm Reactor for Aerobic Wastewater Treatment*, Dickeson et al., Water Environment Federation, pp. 469–471; 1996.

*Design and Performance of Subsurface Flow Constructed Wetlands in Norway*, Jenssen et al.,, 12 pages, IN Symposium Constructed Wetlands in Cold Climates –Design, Operation, Perfromance; Jun. 1996.

*Influence of Temperature on Biogeochemical Processes in Constructed Wetlands: Implications to Wastewater Treatment*, Reddy et al.; IN Symposium Constructed Wetlands in Cold Climates –Design, Operation, Performance, pp. 2 pages; 1996.

*Peat Filter and Engineered Wetland Combined System for Treatment of Landfill Leachate*, Castonguay et al., IN Symposium Consturcted Wetlands in Cold Climates, 2 pages; Jun. 1996.

*Septic System Becomes Most Visited Area at Nature Center*, Patterson et al., Land and Water magazine, pp. 44–46; May/Jun. 1996.

*Brew –Bio Reactor Engineered Wetland for Wastewater Treatment*, Ontario Centre for Environmental Technology Advancement, 2 pages; Apr. 1997.

*Constructed Wetlands for Domestic Wastewater Treatment*, Huang et al, Unknown Publication, pp. 66–67 & 70–71; (before 23 Jun. 1998).

*Dosing of Septic Tank Effluent to Improve System Performance*, May, Unknown Publication., 4 pages; (before 23 Jun. 1998).

*Automatic Dosing Siphons for Small Disposal Plants*, Fluid Dynamics, Inc., pp. 1–6, 11–12; (before 23 Jun. 1998).

*The Influence of Cold Climate Upon Constructed Wetlands: Performance of Treating Domestic Wastewater and Landfill Leachate in Norway*, Jenssen et al., Unknown Publication, pp. 137–145, (before 23 Jun. 1998).

Lockart, A.M., "A Comparison of Constructed Wetlands Used to Treat Domestic Wastes: Conventional, Drawdown, and Aerated Systems,"M.S. Thesis, Univ. Iowa (1999).

Leady, "Constructed subsurface flow wetlands for wastewater treatment," (non–thesis project)(1997)(website: http://ce.www.ecn.purdue.edu/puenvhyd/w3–students/leadyms.html).

Labor, Johannes et al. "two strategies for advanced nitrogen elimination in vertical flow constructed wetlands," Water Science & Technology, 35(5):71–77(1997)(abstract only).

Anonymous, "Zoeller High Head Filtered STEP System," Brochure (1998).

Anonymous, "Biotube Pump Vault," Brochure (1998).

Reynolds, "Unit Operation and Processes in Environmental Engineering," pp. 367–386 (1982).

Williams et al., "Trickling filters," IN Manual of Wastewater Treatment, Billings ED (1983).

Tchobanoglous (Revisor), "Wastewater Engineering: Treatment, Disposal, Reuse," McGraw–Hill, NY (1972), pp. 393–467, 468–572, 696–759.

Green et al., "Enhancing Nitrification in Vertical Flow Constructed Wetland Utilising a Passive Air Pump," Wat. Res. 32(12):3513–3520(1998)(abstract only).

McCarthy et al., "Performance of an Aerobic Treatment Unit and Drip Dispersal System for the Treatment of Domestic Wastewater at the Northeast Regional Correction Center," NRRI/TR–01/33 (2001).

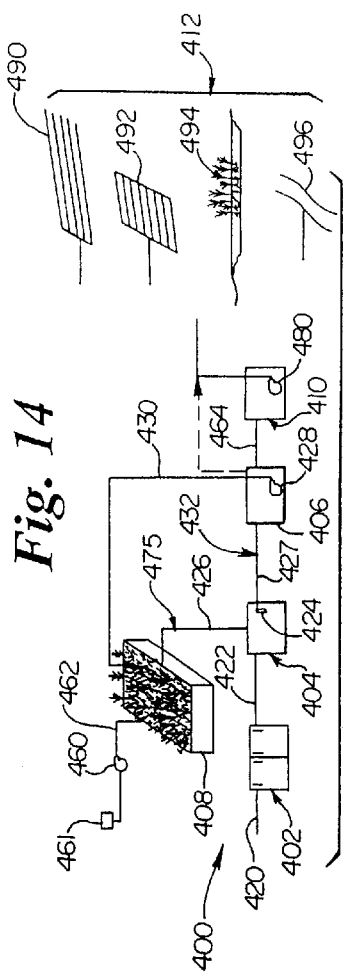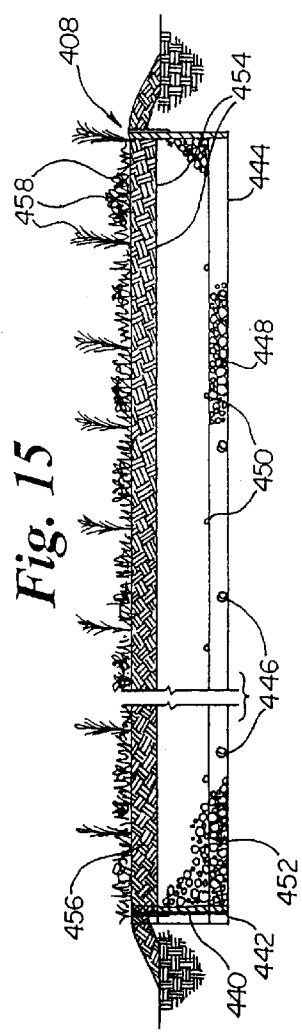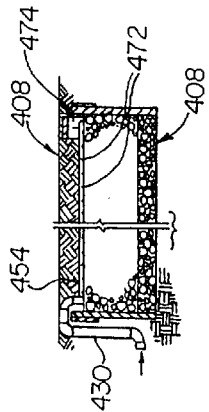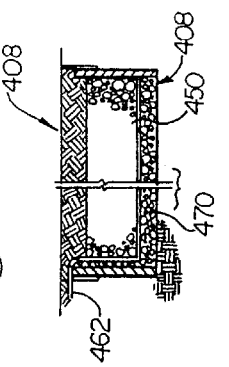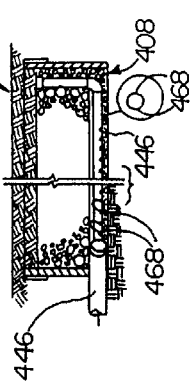

SYSTEM AND METHOD FOR REMOVING POLLUTANTS FROM WATER

CROSS REFERENCE TO RELATED APPLICATIONS

This is a continuation-in-part of U.S. application Ser. No. 09/617,880, filed Jul. 17, 2000, which, in turn, is a continuation-in-part of U.S. application Ser. No. 09/103,075, filed Jun. 23, 1998 now U.S. Pat. No. 6,200,469, which, in turn, claims the benefit under 35 U.S.C. §119(e) of U.S. Provisional Application No. 60/050,533, filed Jun. 23, 1997, the entire disclosure of each application hereby incorporated by reference.

FIELD OF INVENTION

The present invention relates to a system and method for removing pollution from water.

BACKGROUND OF THE INVENTION

It has long been desirable to remove pollutants from water in a safe, efficient and cost-effective manner. Agricultural, industrial, and street runoff, among other polluted water flows, require treatment before being released into the environment. The high concentration of pollutants in these wastes can overwhelm self-purifying mechanisms in the receiving environment. When this occurs, the result is contaminated ground water and/or surface water.

Public wastewater treatment systems typically serve high-density population areas. However, in less densely populated areas or where public sewage treatment is not available, many homes and businesses use a septic system, implemented on-site, for the treatment and disposal of wastewater or sewage.

A typical on-site waste fluid treatment, or septic, system includes a mound or drainfield and a septic tank. Waste fluids such as household sewage may include wastewater from washers and dryers, showers and bathtubs, toilets, disposals, disposal waste, sink wastewater and wastes from various commercial operations. In a typical on-site septic system, the wastewater generally drains into a septic tank before being routed to the mound or drainfield. A septic tank typically separates sewage into solid and liquid fractions, then introduces the separated liquid fraction (effluent) back into the ecosystem with significant levels of undesirable nutrients and other pollution. Undesirable compounds present in the effluent are then decomposed and utilized by soil organisms in the drainfield or mound as the effluent moves (percolates) through the underlying soil profile.

The average life of a conventional on-site wastewater treatment (septic tank and drainfield or mound) system is typically only seven to ten years. A failing septic system can lead to public health concerns and non-point source pollution. Another related concern is the difficulty of quickly and accurately assessing whether the underground septic system is functioning properly. If the conventional system is not functioning properly, untreated, hence polluting, wastewater is likely being released into the ecosystem with little or no surface indication.

A primary concern with any on-site septic system or wastewater treatment system is to ensure that nutrients and other pollutants are removed from the wastewater before the wastewater enters a surface or subterranean body of water. If the treated wastewater is not sufficiently pollutant-free, the effluent will create water quality problems by contaminating surface or subsurface bodies of water.

The ability of wetland plants to remove pollutants from wastewater is known. To this end, natural wetlands have been used as wastewater discharge sites for a long period of time. Thus far, however, constructed wetlands have made only limited use of the potential of wetland vegetation to purify (detoxify) wastewater.

Existing constructed wetlands, including both surface and subsurface flow systems, utilize only wetland plants and atmospheric diffusion to transfer oxygen into (oxygenate) the wastewater being treated (the water column). These naturally aerated (aerobic) zones support populations of oxygen-requiring bacteria. Other areas within the constructed wetland, which are not oxygenated, are anaerobic and support populations of bacteria which do not require oxygen. It is known that aerobic metabolic pathways are much more efficient than anaerobic pathways in decomposing certain types of pollutants. Consequently, aerobic bacteria are capable of consuming, and thus removing, more pollutants than anaerobic bacteria for a given treatment cell size.

In existing constructed wetlands, aerobic zones are typically found only at the top of the water column and in the immediate vicinity of wetland plant roots. The top of the water column is usually a region where there is sufficient gas exchange, via atmospheric diffusion. In the immediate vicinity of wetland plant root hairs, oxygen—translocated by wetland plants into their root systems—diffuses out through the root membranes. These naturally occurring aerobic zones occupy only a small portion of the wetland liquid volume. Thus, the ratio of aerobic activity to anaerobic activity is usually extremely small in natural wetland systems. This lack of aerobic capacity thus limits the overall treatment capacity of the wetland, particularly in subsurface flow constructed wetlands.

FIG. 1 depicts a conventional on-site septic system, and FIG. 2 depicts a constructed wetland treatment system. In FIG. 1, the conventional, on-site septic system is depicted generally at 50. The conventional system 50 includes a sewer line 52 conveying sewage from a house 54 to a septic tank 56. In the septic tank 56, the solids are allowed to settle out of the sewage. The separated liquid wastewater effluent flows from the septic tank 56 to the drainfield (or mound) 58 via a sewer line 59. In the septic tank 56, the wastewater is treated to a limited extent when compounds present in the settled solids and effluent undergo predominantly anaerobic decomposition. However, levels of pollutants present in the wastewater being conveyed from the septic tank 56 are usually too high for direct release into the environment (e.g., direct release into a body of water such as a stream, lake, or aquifer). The final disposal and treatment of wastewater occurs in the drainfield 58, which includes a series of perforated pipes 60. Thus, the wastewater is conveyed by the sewer line 59 from the septic tank 56 to perforated pipes 60 within the drainfield 58. The partially treated wastewater seeps from the perforated pipes 60 into the soil profile underlying the drainfield 58. In the underlying soil profile, the wastewater effluent undergoes a final series of purification steps as it percolates predominately down as discharge 62 through the soil profile.

These purification steps are accomplished by soil organisms—mostly soil microflora. Thus, whether the wastewater effluent will ultimately be purified to an acceptable level before entering a body of water depends on the ability of the soil profile to accommodate the liquid flow and to harbor soil microflora. The texture of the soil profile must permit the wastewater to enter the soil profile from the perforated pipes 60 and percolate generally downwardly, e.g., without pooling the wastewater. Soils with high levels of clay or organic matter generally have low capacities to hydraulically convey wastewater in this respect. Coarse textured soils have higher proportions of sand and silt particles and possess higher degrees of hydraulic conductivity. The discharged wastewater (discharge 62), whether or not adequately treated, percolates down to aquifers or can also be conveyed somewhat laterally into exposed bodies of water 64. Thus, one limitation of the conventional system depicted in FIG. 1 is that the drainfield 58 cannot be located within a specified distance from to a surface body of water or cannot be used at all if the water table (aquifer) underlying the drainfield or mound is sufficiently high. Another disadvantage of the system 50 is that the soil profile underlying the drainfield 58 will slowly lose its hydraulic conductivity. The loss of hydraulic conductivity is due to such factors as unsettled solids conveyed by the wastewater, soil bacteria, substances associated with soil bacteria (e.g., polysaccharides), and solidified wastewater components. These substances slowly fill the spaces (pores) between the soil particles. When these pores become filled, the soil becomes incapable of conducting the wastewater through the soil profile and the wastewater cannot be exposed to the soil bacteria. In time, the conventional disposal system 50 will fail to purify the sewage and will itself become a source of pollution. Present remedies for failed disposal systems of this nature include replacing and/or relocating some or all of the components (e.g., the drainfield), "resting" the system by discontinuing disposal system use for a period of time, and treating the soil with chemical agents. Discontinuing use of the disposal system is often not feasible. Treating the soil with chemical agents has not been effective in most situations. Thus, the expensive process of replacing and/or relocating underground components is often the only feasible method of restoring a functional septic system.

FIG. 2 depicts a sewage disposal system 70. The sewage disposal system 70 is similar in concept to the conventional system 50 of FIG. 1, but includes a wetland cell 72 and a chemical absorption tank 74. In the system 70, sewage from the house 54 is conveyed to the septic tank 56 via the sewer line 52. In the septic tank 56, solids settle out of the sewage and the separated wastewater effluent is then conveyed from the septic tank 56 to the wetland cell 72 by line 59. While the wastewater is present in the wetland cell 72, many of the pollutants therein are decomposed by mostly anaerobic microflora and wetland vegetation 76. The wetland vegetation 76 also removes some of the inorganic pollutants (e.g., nitrates, phosphates, potassium) as plant nutrients. From the wetland cell 72, the partially treated wastewater is then conveyed to the chemical absorption tank 74. The chemical absorption tank 74 usually contains minerals such as limestone or other substances (e.g., activated charcoal, kiln-fired clay beads, wollastonite, taconite tailings) with high surface areas and absorptive characteristics to further remove undesirable compounds from the wastewater being treated. The fluids are then discharged from the chemical absorption tank 74 directly into the environment if pollutant levels are within acceptable limits. Alternatively, the fluids from the chemical absorption tank 74 may be conveyed to a drainfield 58 as described above for further purification by soil microflora.

Because of the low amount of aerobic habitat present, the disposal system 70 has a disadvantage of relying primarily on anaerobic microflora in the septic tank 56 and the wetland cell 72 to decompose undesirable compounds. Another disadvantage of the disposal system 70 is that the wetland cell 72 is exposed to the atmosphere and, hence, subject to being frozen during winter months. When frozen, the entire system 70 becomes inoperative. Moreover, the roots of the wetland vegetation 76 may be injured or entirely killed if sufficiently low temperatures occur for significant periods of time.

Accordingly, it would be desirable to more fully utilize the pollution and nutrient-reducing characteristics of wetland plants in a constructed system to treat polluted water, the system incorporating a better efficiency of increased aerobic microbial habitat and preferably remaining operational during lower winter temperatures.

SUMMARY OF THE INVENTION

The present invention provides a safe, efficient, and cost-effective manner of reducing pollutant levels in water or other fluids.

One preferred embodiment of this invention includes a substantially impermeable primary treatment cell and an optional secondary treatment cell. The primary treatment cell includes a forced aeration system. A fluid level control system, such as a dosing siphon, may be in fluid communication with the primary treatment cell and the secondary treatment cell (if the secondary treatment cell is present). The substantially impermeable primary treatment cell includes a bed medium such as gravel, a mulch layer, wetland vegetation rooted in the bed medium and extending through the mulch layer, and a forced aeration system. The secondary treatment cell may be substantially permeable to allow treated wastewater within to egress by infiltration and may further contain a bed medium for further removal of pollutants. The dosing siphon lowers the level of the wastewater being treated in the primary treatment cell so that lower wastewater levels are present for a sufficient amount of time to stimulate deeper, more pervasive root growth within the bed medium. The lower water levels also provide atmospheric oxygen to, and thereby stimulate the growth of, aerobic bacteria. The forced aeration system establishes alternating aerobic and anaerobic zones within the substantially horizontally-flowing wastewater being treated in the primary treatment cell so that wastewater in the substantially horizontal flow is exposed to aerobic and anaerobic zones for a significant period of time. By being exposed to both aerobic and anaerobic zones for a significant period of time, the decomposition of pollutant compounds occurs more rapidly and completely than if predominantly anaerobic zones were present.

It is an object of this invention to provide a constructed subsurface flow, wetland system that can be used efficiently, effectively and safely to remove pollutants from wastewater.

It is a further object of this invention to provide for a calculated variable water level management of wastewater in the constructed wetland subsurface treatment system to promote faster establishment of wetland vegetation, to promote thicker and deeper root growth of the wetland vegetation, and to thereby promote more effective pollutant removal processes.

It is yet another object of this invention to provide a substantially impermeable constructed wetland cell for treating wastewater which is characterized by a generally vertical and unsaturated wastewater flow in a preferred embodiment. The wetland cell may include a bed medium, a wastewater supply system, a wastewater return system, a forced aeration system, and a multiplicity of plants. The wastewater supply system may be configured to deliver the wastewater proximate an upper portion of the bed medium. At least a portion of the wastewater return system may be disposed proximate a lower portion of the bed medium. The multiplicity of plants may be rooted in the bed medium. In this constructed wetland cell, the wastewater flows generally vertically downward from the wastewater supply system, through at least a portion of the bed medium, and is conveyed from the wetland cell via the wastewater return system. The wastewater supply system, the wastewater return system, and the bed medium may be further be configured and disposed such that an unsaturated flow conveys the wastewater from the wastewater supply system, through at least a portion of the bed medium, to the wastewater return system. The wetland cell may further include an air source for increasing the oxygen supply within the constructed wetland cell. A forced aeration (air supply) system may be present and may include a blower and pipes with perforations. The perforated pipes may be disposed proximate a bottom portion of the bed medium and the blower may force atmospheric air through the pipe perforations such that the wastewater becomes oxygenated while flowing through spaces in the bed medium. The wetland cell may further include a layer of substantially decomposed mulch overlaying the bed medium. The substantially decomposed mulch may comprise peat.

It is a further object of this invention to provide a system for treating wastewater, the system including a forced aeration (air supply) system, a constructed wetland cell, and a disposal system. The air supply may be configured to increase oxygen concentration in the wastewater being treated by aspirating air into the wastewater. The constructed wetland cell may include a bed medium, a wastewater supply system, a wastewater return system, and a multiplicity of plants. At least a portion of the wastewater supply system may be disposed proximate an upper portion of the bed medium. At least a portion of the wastewater return system may be disposed proximate a lower portion of the bed medium. The plants may be rooted in the bed medium and extend through the mulch layer. The disposal system may receive treated wastewater from the constructed wetland cell. The system may further include a substantially decomposed mulch layer (e.g., peat) overlaying the bed medium. The system may yet further include a structure with a chamber for separating solids from the wastewater, such as a septic tank. A substantial portion of the solids are ideally separated from the wastewater before the wastewater is conveyed to the constructed wetland cell. The system may still further include a filter tank receiving wastewater from the septic tank and treated wastewater from the constructed wetland cell. The wastewater from the septic tank and the treated wastewater from the constructed wetland cell are blended in the filter tank. The system may still yet further include a recirculation tank receiving the filtered and blended wastewater from the filter tank and conveying the filtered and blended wastewater to the constructed wetland cell. The system may still yet further include a dosing tank receiving treated wastewater from the recirculation tank. The dosing tank may convey the treated wastewater to a disposal system. Alternatively, the treated wastewater may be conveyed from the recirculation tank directly to the disposal system.

Another embodiment of the present invention includes a structure with a cavity for settling solids from sewage and a recirculation chamber in fluid communication with said cavity. A pump and aspirator are present. The pump pumps the wastewater from the recirculation chamber through the aspirator, thereby increasing the dissolved oxygen concentration in the wastewater. From the aspirator the wastewater is conveyed to a substantially impermeable wetland cell. The wetland cell may include a bed medium, a wastewater supply system and a wastewater return system. At least a portion of the wastewater supply system is disposed proximate an upper portion of the bed medium and at least a portion of the wastewater return system is disposed proximate a lower portion of the bed medium. The oxygenated wastewater is pumped from the pump and aspirator, through the wastewater supply system, to an upper portion of the bed medium and allowed to flow substantially vertically through the bed medium. When the wastewater arrives at a lower portion of the bed medium, it is conveyed away from the wetland cell by the wastewater return system to the recirculation chamber. In the recirculation chamber, treated wastewater from the wetland cell is blended with untreated wastewater from the settling cavity. The blended wastewater may be cyclically routed to the wetland cell or conveyed to a disposal system.

Yet another embodiment of the present invention includes a structure with a wetland unit and an anaerobic, fluid-impermeable unit, optionally integrally formed in an easily installed unit. The wetland unit includes a granular bed medium. A mulch layer is optionally present overlaying the medium and vegetation is optionally rooted in the medium. The anaerobic unit is optionally positioned beneath the wetland unit and may form first and second chambers. The first chamber accommodates an inlet, a mixing device and a filter. The mixing device may possess a large surface area to provide habitat for anaerobic microflora. The filter removes particulates from the wastewater as the wastewater is conveyed from the first chamber to the second chamber. A pump may be operationally present in the second chamber to convey wastewater to the wetland unit. The pump may be considered as part of a wastewater supply system. An aerator is optionally present in the conduit between the pump and the wetland unit. The pump also conveys wastewater to an outlet. Operationally, the pump conveys wastewater, via the wastewater supply system to an upper portion of the bed medium. If the aerator is present the wastewater is aerated when being pumped from the second chamber to the wetland unit. After being conveyed from the wastewater supply system, the wastewater, in a substantially vertical and unsaturated flow, flows through the bed medium to a lower portion thereof, where it is then conveyed to the mixing device in the first chamber. The wastewater is aerated while flowing through the bed medium and is aerobically treated during the substantially vertical, unsaturated flow through the bed medium. The mixing device is positioned to receive exogenous wastewater from the inlet and treated wastewater from the wetland unit and to mix the two wastewater flows to enable anaerobic or anoxic decomposition of wastewater pollutants in the first and second chambers. The wastewater is cyclically conveyed: from the first chamber to the second chamber, from the second chamber to the wetland unit, and from the wetland unit to the first chamber. In the first chamber, the treated wastewater from the wetland unit is mixed with exogenous wastewater. The wastewater is also pumped from the second chamber to an outlet when the wastewater has been sufficiently treated. Alternatively, the wastewater is pumped from the wetland unit to the outlet without being mixed with exogenous wastewater.

These and other objects, features, and advantages of this invention will become apparent from the description, which follows and when considered in view of the accompanying figures.

BRIEF DESCRIPTION OF THE DRAWINGS

FIG. 14 is a diagram of an alternate embodiment of this invention including a substantially impermeable constructed wetland cell, the wetland cell providing for vertical, unsaturated wastewater flow therethrough;

FIG. 15 is a fragmentary cross-section of the wetland cell of FIG. 14;

FIGS. 16a, 16b, and 16c are fragmentary cross-sections of the wetland cell of FIG. 14 depicting the wastewater return system, the air supply system, and the wastewater supply system, respectively;

DETAILED DESCRIPTION OF THE INVENTION

Figure 1:
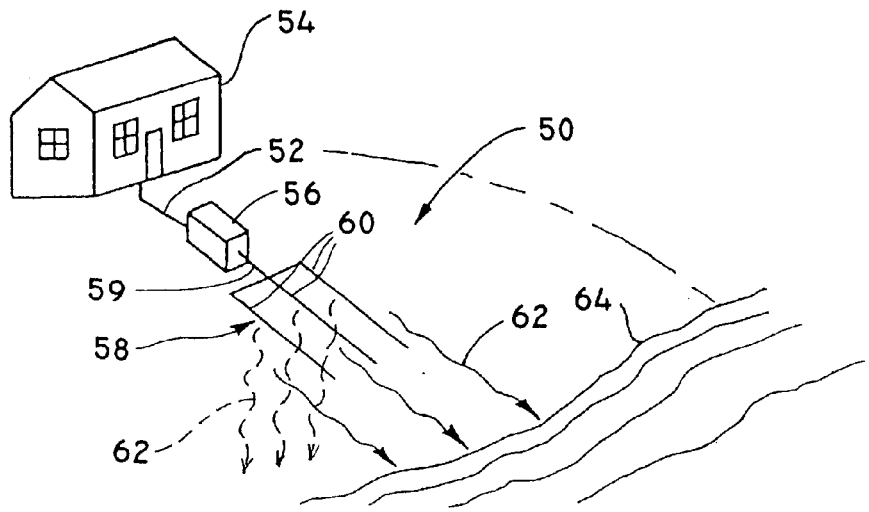
FIG. 1 illustrates a conventional on-site septic system.
Figure 2:
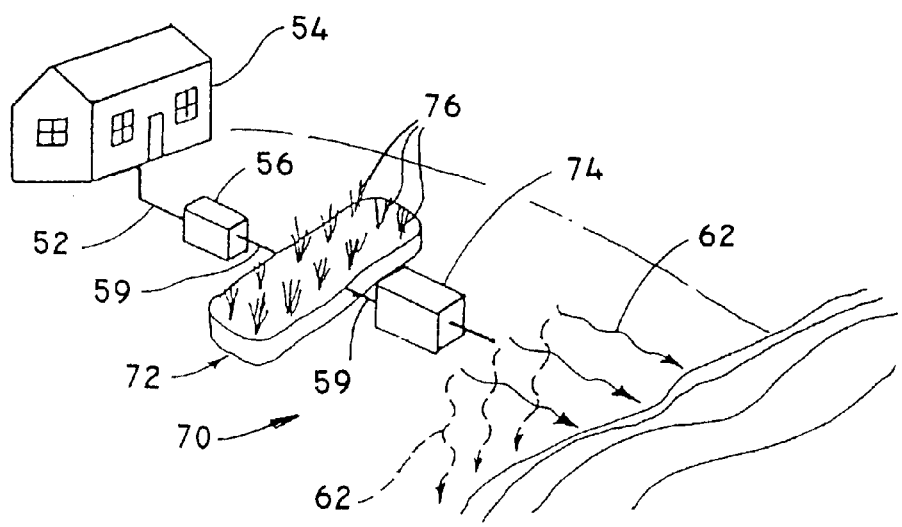
FIG. 2 depicts a wastewater disposal system with a constructed wetland and a chemical absorption tank.

In a first embodiment, this invention provides a subsurface constructed wetland system which substantially increases the presence of aerobic zones within the treatment bed. The enhanced aerobic habitat promotes enhanced and more pervasive root growth and stimulates growth and development of aerobic microflora for more effective wastewater effluent treatment. The wastewater flow is preferably saturated and substantially horizontal in this first embodiment. In another embodiment the provided wetland is configured for a substantially vertical and unsaturated wastewater flow therethrough.

The terms "wastewater" and "effluent" are contemplated to describe water in which environmentally undesirable compounds are present. Thus, the terms wastewater and effluent include without limitation, substantially liquid portions of solutions, mixtures, and suspensions of water and substances considered as pollutants by persons of ordinary skill in the art. Concentrations or titers of these substances must be reduced during wastewater treatment before the treated wastewater can be safely released into the environment. Origins of these wastewaters or effluents include industrial, domestic and municipal sewage, wastes, and the like. The term "sewage" is contemplated to include the above-described solutions, suspensions, and mixtures, which contain solids which can be separated to some extent by settling. Some compounds are almost always considered pollutants. Other compounds are considered pollutants only under certain circumstances.

The subject matter of this invention is related to the following documents, which were incorporated by reference in U.S. Provisional Application No. 60/050,533, the benefit of which is claimed under 35 U.S.C. §119(e). These documents are hereby again expressly incorporated by reference.

Behrends, L. L. et al. "Reciprocating Subsurface-Flow Constructed Wetlands for Removing Ammonia, Nitrate, and Chemical Oxygen Demand: Potential for Treating Domestic, Industrial and Agricultural Wastewaters." Proceedings of WEFTEC® '96, 69th Annual Conference and Exposition of the Water Environment Federation. Water Environment Federation. 1996.

Breezer, Harlon W., et al. "Thermoplastic Aquatic Biomass Containment Barrier with Reinforced Hinge." U.S. Pat. No. 5,050,341. Sep. 24, 1991.

Brix, H. "Macrophyte-Mediumted Oxygen Transfer in Wetlands: Transport Mechanisms and Rates." Chapter 41 of *Constricted Wetlands for Water Quality Improvement*. CRC Press, Inc. 1993.

Burgoon, P. S., et al. "Domestic Wastewater Treatment Using Emergent Plants Cultured in Gravel and Plastic Substrates." Chapter 38 of *Constructed Wetlands for Wastewater Treatment: Municipal, Industrial*, and *Agricultural*. Lewis Publishers, Inc. 1991 printing.

Davies, T. H., et al. "Application of Constructed Wetlands to Treat Wastewaters in Australia." Chapter 64 of *Constructed Wetlands for Water Quality Improvement*. CRC Press, Inc. 1993.

Davies, T. H., et al. "Phosphorous Removal from Wastewater in a Constructed Wetland."Chapter 32 of *Constructed Wetlands for Water Quality Improvement*. CRC Press, Inc. 1993.

Dinges, Ray. "Method for Application of Wastewater to Plants for Improved Wastewater Treatment." U.S. Pat. No. 4,872,985. Oct. 10, 1989.

Division of Environmental Health. Bureau of Environmental and Occupational Health, Michigan Department of Public Health. "Michigan Criteria for Subsurface Sewage Disposal."April 1984.

Dickeson, Dan, et al. "Compact Biofilm Reactor for Aerobic Wastewater Treatment." Proceedings of WEFTEC® '96, 69th Annual Conference and Exposition of the Water Environment Federation. Water Environment Federation. 1996.

Fluid Dynamic Siphons, Inc. "Automatic Dosing Siphons for Small Disposal Plants."Brochure.

The Friends of Fort George. "Sewage Waste Amendment Marsh Process Project (S.W.A.M.P.). Interim Report." Niagara-On-The-Lake, Ontario. September 1995.

Gersberg, Richard M., et al. "Integrated Wastewater Treatment Using Artificial Wetlands: A Gravel Marsh Case Study." Chapter 10 from *Constructed Wetlands for Wastewater Treatment: Municipal, Industrial, and Agricultural*. Lewis Publishers, Inc. 1991 printing.

Guntenspergen, G. R., et al. "Wetland Vegetation." Chapter 5 from *Constructed Wetlands for Wastewater Treatment: Municipal, Industrial, and Agricultural*. Lewis Publishers, Inc. 1991 printing.

Huang, J., et al. "Constructed Wetlands for Domestic Wastewater Treatment., pp. 66–71.

Jenssen, P. D., et al. "The Influence of Cold Climate Upon Constructed Wetlands: Performance of Treating Domestic Wastewater and Landfill Leachate in Norway." pp. 137–145.

Kickuth, Reinhold W. "Method of, and Installation for, Purifying Liquids in Horizontally Flow-Through Plants Containing Filter Beds." U.S. Pat. No. 5,273,653. Dec. 28, 1993.

Kickuth, Reinhold W. "Installation for Purifying Liquids Using a Through-Flow-Controlled Aquatic Plant-Containing Filter Bed." U.S. Pat. No. 4,855,040. Aug. 8, 1989.

Lemon, Edgar, et al. "SWAMP Pilot Scale Wetlands—Design and Performance Niagara-On-The-Lake, Ontario." Symposium on Constructed Wetlands in Cold Climates, Design, Operation, Performance. Niagara-On-The-Lake, Ontario, Canada. Jun. 4–5, 1996.

May, Don R., P. E. "Dosing of Septic Tank Effluent to Improve System Performance."Fluid Dynamic Siphons, Inc.

Morrison, Dean N., et al. "Wastewater Treatment System and Method." U.S. Pat. No. 5,156,741. Oct. 20, 1992.

Mote, C. Roland, et al. "Design and Performance of PVC Dosing Siphons."Transactions of the ASAE. American Society of Agricultural Engineers. 1983.

Ontario Centre for Environmental Technology Advancement (OCETA). "OCETA Environmental Technology Profiles." April 1997.

Plosz, Sandor, et al. "Water Purification Process and Apparatus." U.S. Pat. No. 4,333,837. Jun. 8, 1982.

Serfling, Steven A., et al. "Buoyant Contact Surfaces in Waste Treatment Pond." U.S. Pat. No. 4,169,050. Sep. 25, 1979.

Soil Enrichment Systems, Inc. "Natural Resource Management: Restoration Technologies for Stressed Terrestrial, Aquatic, and Wetland Ecosystems." Brochure.

Steiner, Gerald R., et al. "Configuration and Substrate Design Considerations for Constructed Wetlands Wastewater Treatment." Chapter 29 of *Constructed Wetlands for Wastewater Treatment: Municipal, Industrial, and Agricultural*. Lewis Publishers, Inc. 1991 printing.

Stengel, E. "Species-Specific Aeration of Water by Different Vegetation Types in Constructed Wetlands." Chapter 45 of *Constricted Wetlands for Water Quality Improvement*. CRC Press, Inc. 1993.

Todd, John H. "Method for Treating Water." U.S. Pat. No. 5,389,257. Feb. 14, 1995.

Todd, John H., et al. "Solar Aquatic Apparatus for Treating Waste." U.S. Pat. No. 5,087,353. Feb. 11, 1992.

U.S. Environmental Protection Agency. Office of Water Program Operations. Office of Research and Development Municipal Environmental Research Laboratory. "Design Manual: Onsite Wastewater Treatment and Disposal Systems." October 1980.

Water Management Resources Group, Tennessee Valley Authority. "General Design, Construction, and Operation Guidelines: Constructed Wetlands Wastewater Treatment Systems for Small Users Including Individual Residences." May 1993.

Watson, J. T., et al. "Pilot-Scale Nitrification Studies Using Vertical-Flow and Shallow Horizontal-Flow Constructed Wetland Cells." Chapter 31 of *Constructed Wetlands for Water Quality Improvement*. CRC Press, Inc. 1993.

Wolverton, Billy C. "Method for Treating Wastewater Using Microorganisms and Vascular Aquatic Plants." U.S. Pat. No. 4,415,450. Nov. 15, 1983.

Figure 3:
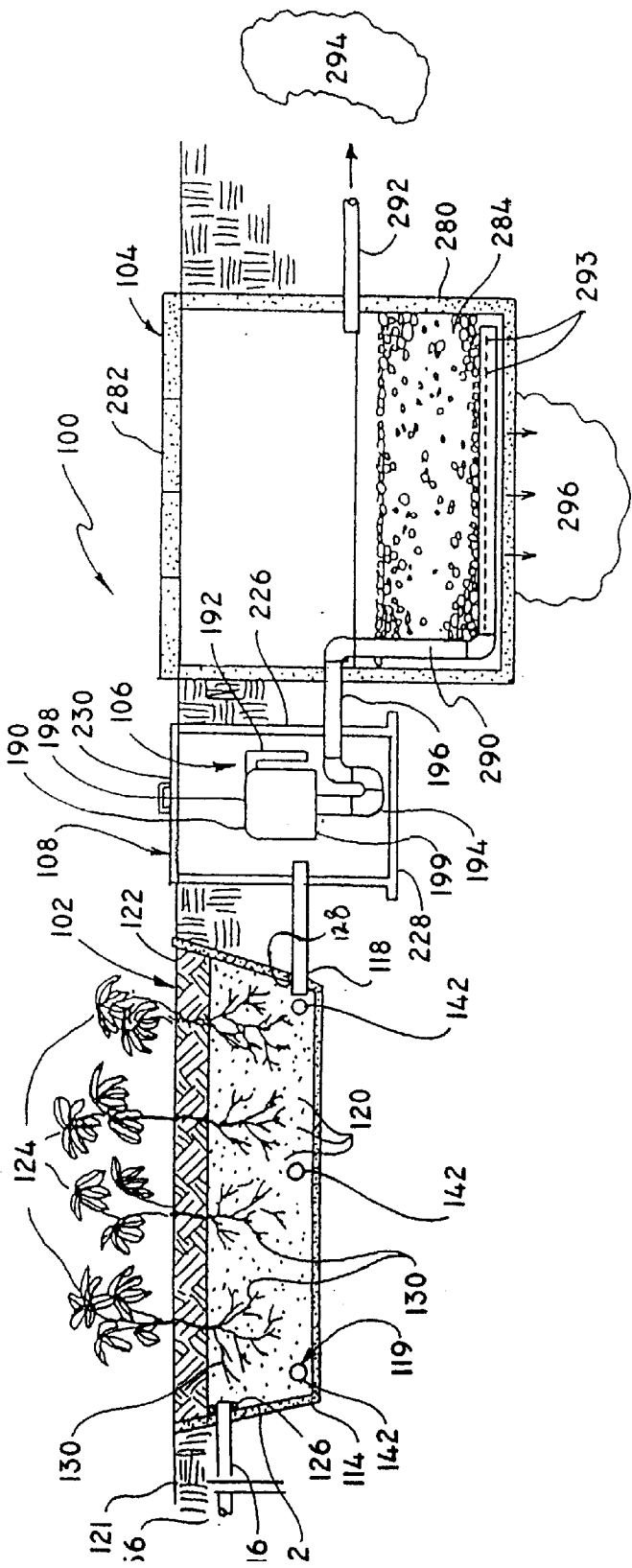
FIG. 3 is a side, cross-sectional view of a subsurface wetland treatment system of this invention with primary and secondary treatment cells.

One embodiment of the present system for removing pollutants from wastewater is depicted in FIG. 3, generally at 100, and includes a primary treatment cell (reactor) 102, a secondary treatment cell (reactor) 104, and a fluid level control system, such as a dosing siphon 106 preferably disposed within a cement dosing chamber 108.

The primary treatment cell 102 includes an excavated basin 112 lined with an impermeable liner 114. Suitable materials for the impermeable liner 114 will ensure that wastewater present in the primary treatment cell 102 will not leak into the soil surrounding the basin 112. These materials include synthetic resins such as polyethylene, polyvinylchloride, and polypropylene sheeting. Alternatively, a cement basin coated with a waterproof (e.g., bituminous) material may be used.

Figure 4:
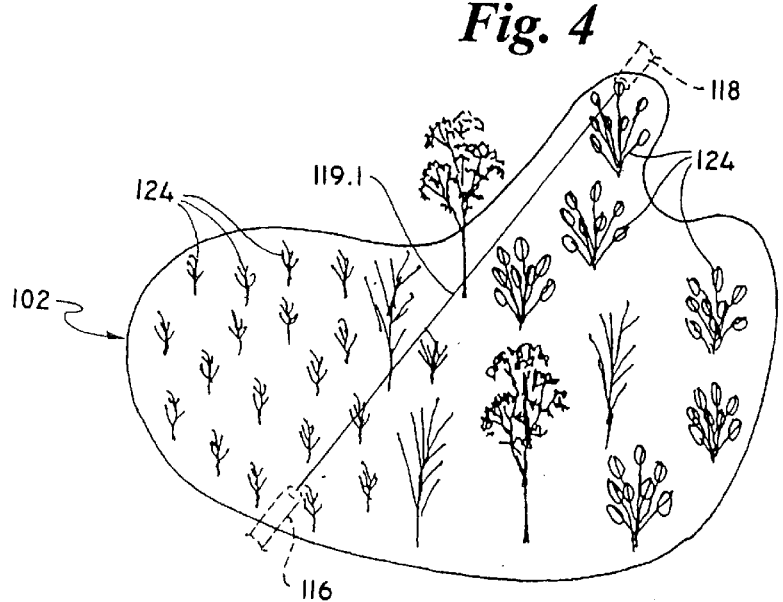
FIG. 4 illustrates a plan view of one embodiment of the primary treatment cell of FIG. 3.

An inlet 116 and an outlet 118 extend through the impermeable liner 114. A portion of an aerator system 119 extends generally transversely to a linear dimension 119.1 between the inlet 116 and the outlet 118 in this embodiment (FIG. 4), so that the substantially horizontally flowing wastewater being treated in the primary treatment cell will flow through zones in which forced aeration is occurring.

Returning to FIG. 3, a bed medium 120 fills the basin 112 generally to a level above the inlet 116 and to a specified interval below the surface 121 of the soil in which the primary treatment cell 102 is disposed. A mulch layer 122 overlays the bed medium 120. Wetland vegetation 124 is rooted in the bed medium 120 and extends (grows) through the mulch layer 122 in this embodiment. The depth of the basin 112, while typically between about 12 to 24 inches, may be practical up to a depth of about 24 feet. Other factors, discussed below, may make depths greater than about 24 feet impractical. The volume of the basin 112 in part determines the capacity of the primary treatment cell 102 to purify wastewater. Thus, the volume of the primary treatment cell 102 may vary to accommodate differing amounts of wastewater to be treated and different concentrations and types of pollutants to be removed from the wastewater. For example, up to about 600 gallons per day of domestic sewage is often generated by a four bedroom, single family dwelling. Adequately treating the wastewater from this amount of sewage would typically require an embodiment of the present primary treatment cell with a capacity of about 10,000 cubic feet. However, an equal amount of wastewater that is more difficult to treat, such as from a dairy or slaughterhouse, might require a primary treatment cell capacity of about 27,500 cubic feet at the same flow rate. An inlet seal 126 and an outlet seal 128 are used to insure that wastewater leakage will not occur from the primary treatment cell 102 where the inlet 116 and outlet 118 extend through the liner 114. These holes in the liner 114 accommodate the inlet 116 and outlet 118 and are typically slightly smaller than the outer diameters of the inlet 116 and the outlet 118. The inlet 116 and outlet 118 are forced through these holes. The seals 126 and 128 are constructed to provide an impermeable barrier to fluid escape. Suitable materials for inlet and outlet seals 126 and 128 include adhesive mastic. The inlet 116 and the outlet 118 may be made from such materials as schedule 40 polyvinylchloride (PVC) or metals such as cast iron. While the dimensions of the inlet 116 and the outlet 118 may vary, outer diameters between about four inches and six inches have been found to be suitable for many uses.

Functionally, the spaces between the bed medium 120 particulates accommodate the roots 130 of the wetland vegetation 124. The bed medium particulates provide an external surface area, thereby habitat, for growth and development of the microflora within the primary treatment cell 102. The specific materials used to make up the present bed medium, therefore the type of microflora found proximate the bed medium, may be specific to the types of pollutants to be removed from the wastewater. However, one general requirement is that the surface areas of bed medium particles should be maximized within limits. Gravel is often a preferred bed medium because of its inexpensive cost and generally adequate surface area. By way of illustration and not limitation, average maximum cross sectional dimensions (e.g., diameter) of gravel suitable for the present bed medium may be between about one inch and two inches, between about ½ inch and one inch, and between about ¼ inch and ¾ inch. Although gravel is often a preferred medium for treating certain types of wastewater, the use of gravel should not be deemed limiting. It is known that certain types of other materials are advantageous when dealing with specific water pollution problems. For example, using a bed medium containing soluble forms of calcium or magnesium (e.g., limestone) is beneficial to neutralize wastewater with an acid pH (acid mine drainage). It is also anticipated that certain types and shapes of synthetic media may be desirable under certain circumstances. For example, these synthetic media may include spherical plastic beads. It is also possible to create clay pellets, which are kiln-fired in a manner to make them stable in water. These kiln-fired clay pellets may be used as a bed medium, e.g., as a gravel substitute. It is further anticipated that the type of clay used could be specific to the type of pollutants being removed (i.e., phosphorous removal by taconite or other iron-containing materials). It is additionally anticipated that certain materials could be added to the clay pellets during manufacture to further enhance the pollutant removal capability of the present bed medium. For example, clay and sawdust mixtures could be used to form medium particulates. Kiln-firing would eliminate the sawdust to produce hardened clay pellets with increased porosity and surface area due to the pores created when the sawdust was burned away. It is also anticipated that certain types and shapes of synthetic media may be desirable under certain circumstances. Exemplary media might contain intersecting, often arcuate, polyethylene ribs (fins) for increased surface area. Suitable such media include "Tripack™" from Jaeger Products, Inc., Houston, Tex. and "Nor-Pac™" from NSW Corporation, Roanoke, Va.

As stated above, one function of the present bed medium 120 is to provide surface area, therefore accommodate or harbor, microflora which break down pollutants in the wastewater being treated. These microfloral organisms include bacteria, fungi, and actinomycetes. Without wishing to limit the present invention to any specific theory, the bacteria are considered to perform most of the decomposition and purification functions within the present system. Suitable bacteria for these functions include those from the taxa Bacillus, Pseudomonas, Nitrobacter, Nitrosomonas, Cellulomonas, Aerobacter, Rhodopseudomonas, and Anabaena.

These and other bacteria performing these functions have been further characterized as cyanobacteria, anaerobic bacteria, aerobic bacteria, and photosynthetic bacteria. The roles played by some of these bacteria in purifying wastewater are more fully discussed hereinbelow.

Figure 5:
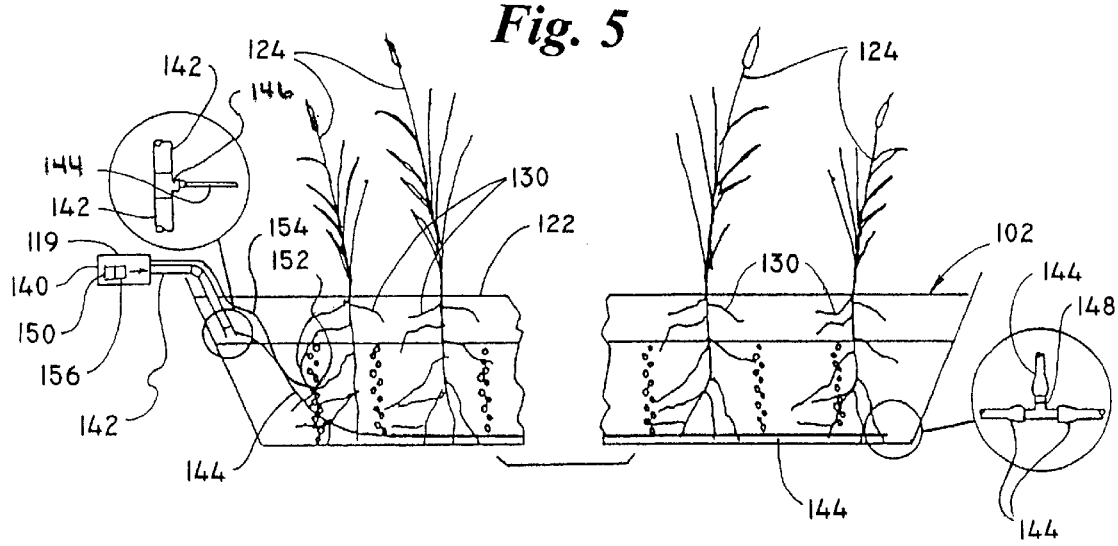
FIG. 5 is a fragmentary cross-section of the primary treatment cell of FIG. 3 with one embodiment of a forced-air aerator.
Figure 6:
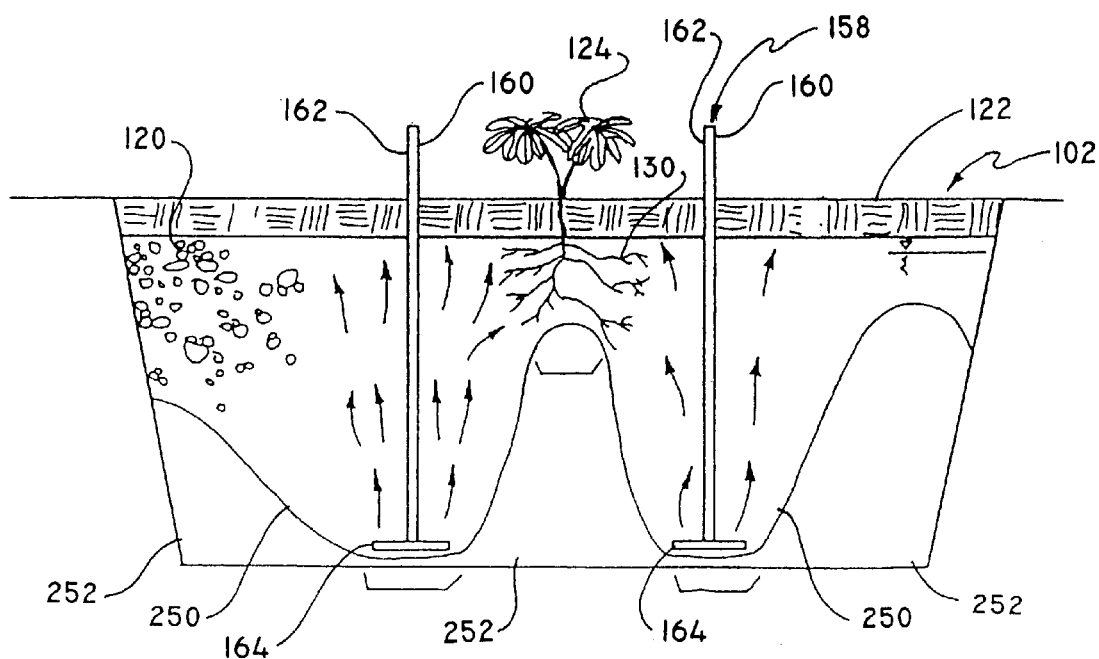
FIG. 6 is a fragmentary cross-section of the primary treatment cell of FIG. 3 with an alternate embodiment of the forced-air aerator of FIG. 5.

The forced aeration system of this invention is depicted in FIGS. 3, 5, and 6. Referring to FIG. 5, the aerator system 119 includes an air pump 140, a system of air pipes (tubes) 142, and a system of air delivery hoses 144 extending from the air pipes 142. In this embodiment, the air pump 140 is electrically operated and may be configured to either continuously or intermittently pump air. The pipes 142 are connected to the hoses 144 by connectors such as T-couplings 146. In some embodiments, the air hoses 144 are further branched by means of connectors such as T-couplings 148. The pipe 142 may be suitably made from schedule 40 PVC or other, more flexible conduits made from synthetic resin. In one embodiment, the air hose 144 includes a perforated flexible hose and multiplicity of emitters commonly used in drip irrigation. One exemplary emitter is disclosed in U.S. Pat. No. 5,332,160, hereby incorporated by reference. The present air pump may include a timer 150 if intermittent pumping is desired. Also contemplated to be within the scope of the present invention is an oxygen sensor 152. The oxygen sensor 152 communicates electrically via a lead 154 with a circuitry 156, which may be present within the pump 140 or located remotely. When the oxygen concentration of the wastewater proximate the oxygen sensor 152 is below a specified first level, the circuitry 156 activates the air pump 140. When the oxygen concentration of the wastewater proximate the oxygen sensor 152 is above another specified second level, the circuitry 156 deactivates the air pump 140.

Referring to FIG. 6, an alternate embodiment of the forced aeration system is indicated at 158 and is present as a plurality of aeration headers 160. Each aeration header 160 includes an air intake 162 and a base 164. An air pump (e.g., within the base 164) pulls atmospheric air through the air intake 162 and expels the air out the base 164 through a series of orifices (not shown). As the expelled air bubbles upwardly in the wastewater, the surrounding water becomes oxygenated in a manner discussed hereinbelow. Of course, timers and oxygen sensors could also be used to control the air pump in the aeration header 160.

The mulch layer 122 is depicted, e.g., in FIGS. 3, 5, and 6 as overlaying the bed medium 120. The present mulch layer may include a variety of materials. For example, substantially decomposed yard waste and peat moss are exemplary natural substances, which can be used in the present mulch layer. In one embodiment, Sphagnum is a preferred material for the mulch layer 122. However, other types of materials may also be suitable, especially materials which are also substantially decomposed. It has been discovered that using natural materials which are not substantially decomposed (e.g., green wood chips) may actually cause pollutants to be added to, rather than removed from, the wastewater being treated by the present system. Because these undecomposed materials are themselves undergoing decomposition within a mulch layer, decomposition byproducts can leach into the primary cell and add to the load of compounds which comprise pollutants. Additionally, the microflora within the present primary treatment cell may be adversely affected by these decomposition byproducts as well. It is also contemplated that the present mulch layer may be a combination of synthetic and substantially decomposed natural materials. In one embodiment, the present mulch layer includes a mixture of Styrofoam™ bits and peat moss.

Among the functions fulfilled by the present mulch layer are enabling gas exchange and providing insulation and odor control. For efficient operation of the present subsurface flow-constructed wetland system, oxygen exchange—via atmospheric diffusion at the wastewater surface—should be maximized between the underlying bed medium and wastewater and the atmosphere. Hence, it is important that the present mulch layer not be so thick as to inhibit this beneficial oxygen transfer. However, the present mulch layer must also be sufficiently thick to provide insulation so that the underlying microflora and aquatic plant root structures are not injured by cold temperatures and to provide odor control as well.

Figure 7:
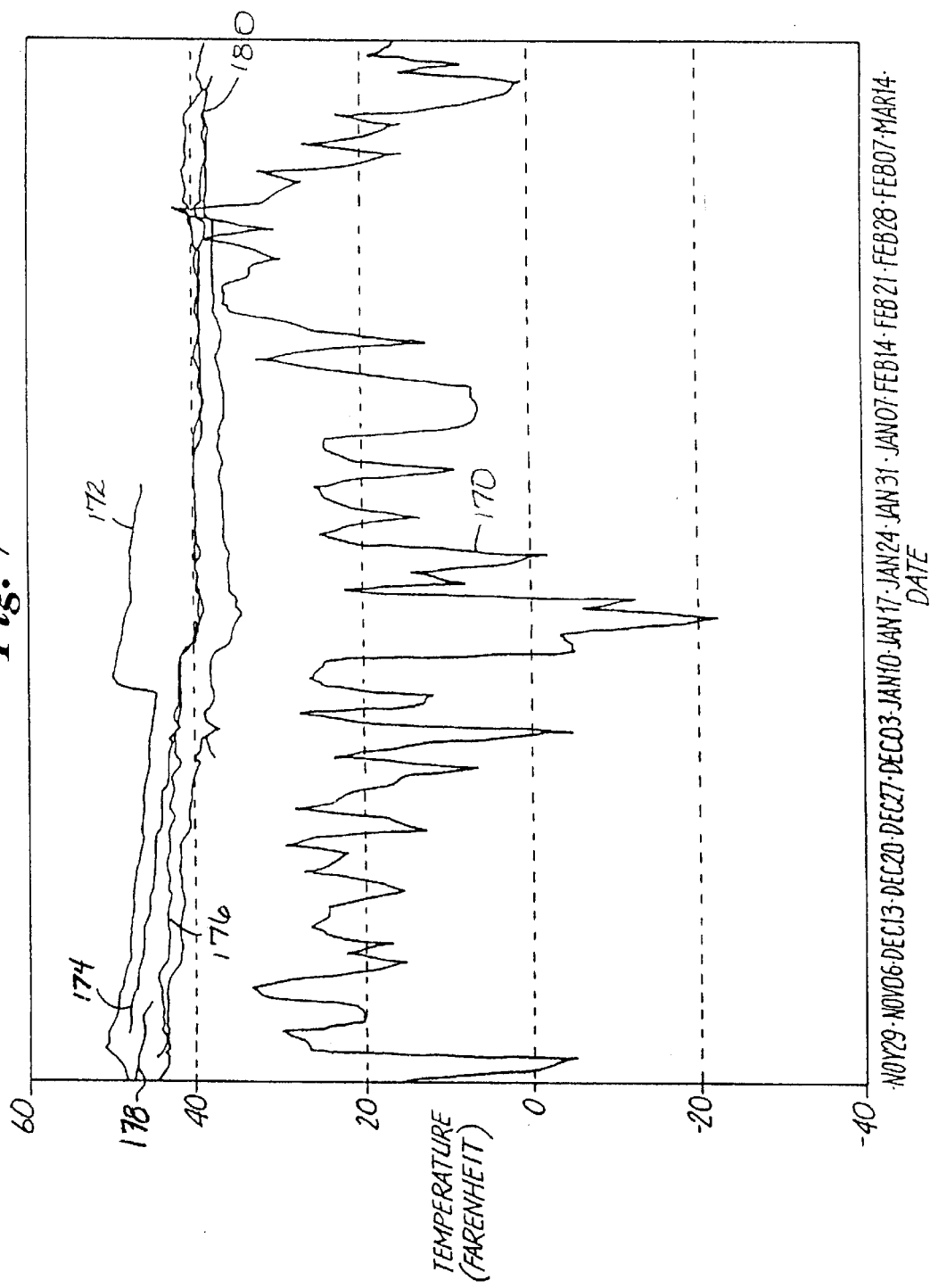
FIG. 7 is a graphic representation of air temperature vs. system temperature, illustrating the insulating effect of the present mulch layer.

In FIG. 7, a lower line 170 represents air temperature readings taken between November, 1997 and March, 1998 at several locations where embodiments of the present invention were installed and used to purify wastewater. The readings were generally taken in the morning hours and were representative of the daily low temperatures during that period. The upper graph lines 172, 174, 176, 178, and 180 represent corresponding temperatures of the wastewater present in the primary treatment cells at five locations at a depth of about 18 inches below the top of the mulch layer. These primary treatment cells were all located in Minnesota, United States. The mulch layer of each bed was constructed to be about 14 inches in depth. After settling, the mulch layer depth was generally between about 12 and 14 inches. As FIG. 7 demonstrates, the wastewater temperature in the primary treatment cells never fell below the freezing point—even when ambient air temperatures dropped well below 0° F. Advantageously, the present primary treatment cell with a mulch layer of about 14 inches provides generally adequate insulation, allowing the liquid in the present treatment cell to remain above freezing in climates similar to those of Minnesota. Additional studies have demonstrated that this mulch layer depth can be reduced to as little as six inches, yet provide adequate insulation. Hence, the microflora and wetland vegetative root systems are not injured by low winter temperatures and remain active, thereby continuing to remove pollutants from the wastewater being treated. Of course, greater or lesser mulch layer depths may provide sufficient insulation in other climates.

The present mulch layer must also have a sufficient depth to provide odor control. Anaerobic decomposition of pollutant compounds may result in the liberation of odiferous gases such as hydrogen sulfide ($H_2S$) and ammonia ($NH_3$) or otherwise objectionable gases such as methane ($CH_4$). It is known that bacteria present in substantially decomposed mulch layers metabolize these objectionable compounds into other less objectionable compounds. Thus, depending upon the requirements of gas exchange, insulation, and odor control, the present mulch layer may be less than or equal to about 24 inches in depth, between about 6 and 24 inches in depth, between about 6 and 14 inches in depth, between about 14 and 24 inches in depth, between about 6 and 12 inches in depth, between about 12 and 24 inches in depth, between about 6 and 14 inches in depth, between about 12 and 14 inches in depth, about 14 inches in depth, about 12 inches in depth, or about 6 inches in depth.

The present wastewater treatment system advantageously includes a wetland vegetative population 124 rooted in the bed medium 120 and extending (growing) through the present mulch layer. The wetland plants used in the present invention may be varied, the composition depending upon such variable factors as latitude (or altitude), the amount and types of pollutants present, and desired aesthetic appearance. The latitude and/or altitude at which the present system is to be installed will in part determine which wetland plant species will be adapted the locale, e.g., how much tolerance to cold/hot weather is required. Another factor for selecting appropriate vegetation is the specific root growth habitat desired. The preferred wetland vegetation has roots 130 which will grow underwater in the bed medium to encompass substantially the full extent of the primary treatment cell 102, especially when the present primary treatment cell includes a forced aeration system. The depth and invasiveness of the vegetative root structure 130 is an important factor in promoting efficient and effective pollution removal.

Figure 8:
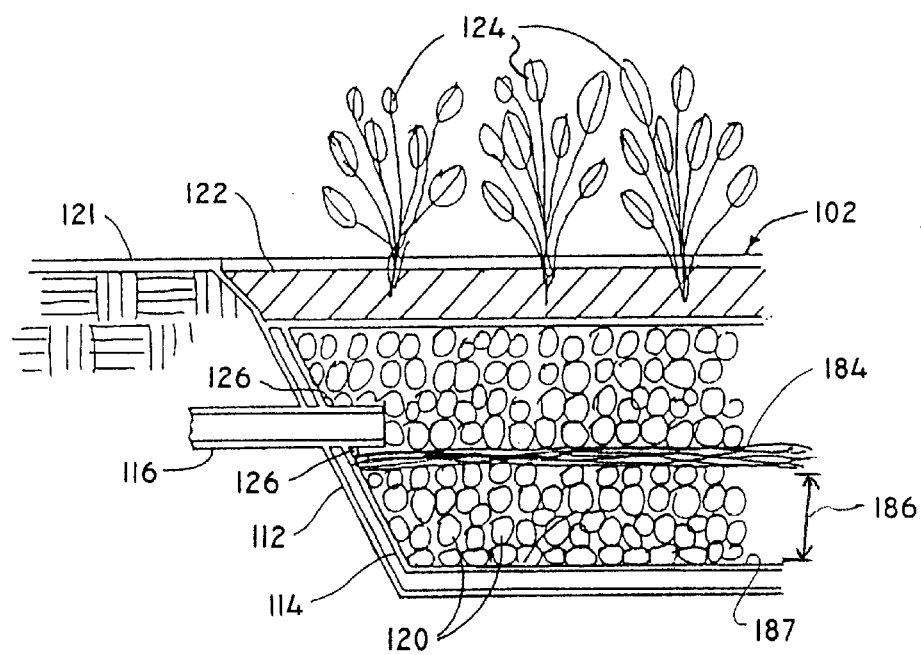
FIG. 8 is a fragmentary view of the primary treatment cell of FIG. 3.

FIG. 8 depicts a fragmentary cross section of a portion of the primary treatment cell 102. As can be seen, the impermeable liner 114 extends circumferentially around the subterranean portion of the primary treatment cell 102. The inlet 116 enters the present primary cell generally at a generally upper location. The amount of wastewater in the present primary treatment cell is regulated to ensure that a maximum wastewater level 184 does not rise above the inner diameter of the inlet 116 to prevent backflow of untreated water. A vertical treatment zone 186 is considered to extend from the bottom 187 of the present primary treatment cell to the wastewater level 184.

The wetland plants 124 enhance the treatment of wastewater in several ways. As wastewater being treated flows substantially horizontally through the present primary treatment cell, bacteria proximate the surface of the bed medium 120 remove pollutants from the wastewater. Oxygen diffuses from root hairs into a portion of the wastewater in the primary treatment cell 102. Compounds present in the wastewater, often produced by bacterial action, are then taken up by the vegetation as nutrients to produce plant biomass. Moreover, large quantities of water can be removed from the primary treatment cell by evapotranspiration. The wetland vegetation 124 also secretes enzymes and other exudates when metabolizing pollutant compounds or obtaining trace nutrients. These exudates often promote decomposition of these pollutant compounds. Moreover, the present wetland plants 124 are often in a symbiotic relationship with mycorrhizal fungi to further facilitate many chemical reactions necessary for the growth and development of these wetland plants and decompose pollutant compounds.

By way of illustration and not limitation, suitable wetland vegetation is contemplated to include species which are adapted to the present generally saturated primary cell. Suitable wetland species may include at least some species within the genera Andropogon spp., Acorus spp., Asclepias spp., Aster spp., Carex spp., Cornus spp., Eleocharis spp., Heliopsis spp.,Iris spp., Juncus spp., Lemna spp. Phalaris spp., Phragmites spp., Populus spp., Potamogeton spp., Ratiba spp., Rudbeckia spp., Sagittaria spp. Salix spp., Schoenoplectus spp., Scirpus spp., Solidago spp., Spartina spp., and Typha spp. Suitable species include *Scirpus atrovirens, Acorus, calamus, Asclepias incarnata, Aster novae-anglae, Avicennia nitida,, Alnus glutinosa, Bolboshoenus maritimus, Canna flaccida, Ceratophyllum submersium, Carex gracilescens, Carex acutiformis, Colocasia esculenta, Cornus stolonifera, Cyperus alternifolius,, Eleocharis dulcis, Eleocharis sphacelata, Glyceria maxima, Heliopsis helianthoides, Hydrocharis morsusranae, Iris pseudacorus, Iris versicolor, Juncus subnodulus, Myriophyllum spictatum, Nyssa sylvatica, Phalaris arundinacea, Phragmites australis, Phragmites communis, Potamogeton pectinatus, Ratiba pinnata, Redbeckia hirta (serotina), Sag-*

*ittaria latifolia, Schoenoplectus lacustris, Scirpus lacustris, Scirpus cyperinus, Scirpus rubricosus, Scirpus pedicellatus, Scirpus longii, Scirpus robustus, Scirpus validus, Scirpus pungens, Solidago rigida, Spargium erectum. Spartina alterniflora, Spartina pectinata, Stratiotes aloides, Taxodium distichum, Tricularia vulgaris, Typha angustfolia, Typha latifolia, Typha domingensis, Typha orientalis, Typhoides arundiaseae,* and *Zantedeschis aethiopica.* However, it is understood that the scope of this invention is contemplated to include any suitable species, whether or not the roots require wet or saturated soils.

Returning to FIG. 3, one embodiment of the present fluid level control system is the dosing siphon 106 and dosing chamber 108. This embodiment of the dosing siphon 106 includes a siphon bell 190, a siphon bell vent 192, a siphon leg (trap) 194, and a siphon discharge pipe 196. Other dosing siphons may include a vent and overflow (not shown) in fluid communication with the discharge pipe 196. In the embodiment depicted in FIG. 3, the dosing siphon 106 begins to discharge wastewater from the dosing chamber 108 when the wastewater level reaches the top 198 of the siphon bell 190 and continues to discharge wastewater until the wastewater level reaches the bottom 199 of the siphon bell 190. Thus, the minimum and maximum wastewater levels within the present primary treatment cell can be determined by a siphon bell vertical dimension, such as the distance from the top to the bottom of the siphon bell 190. However, persons of ordinary skill in the art will recognize that other minimum and maximum wastewater levels are also possible with respect to the present dosing siphon.

Figure 9A:
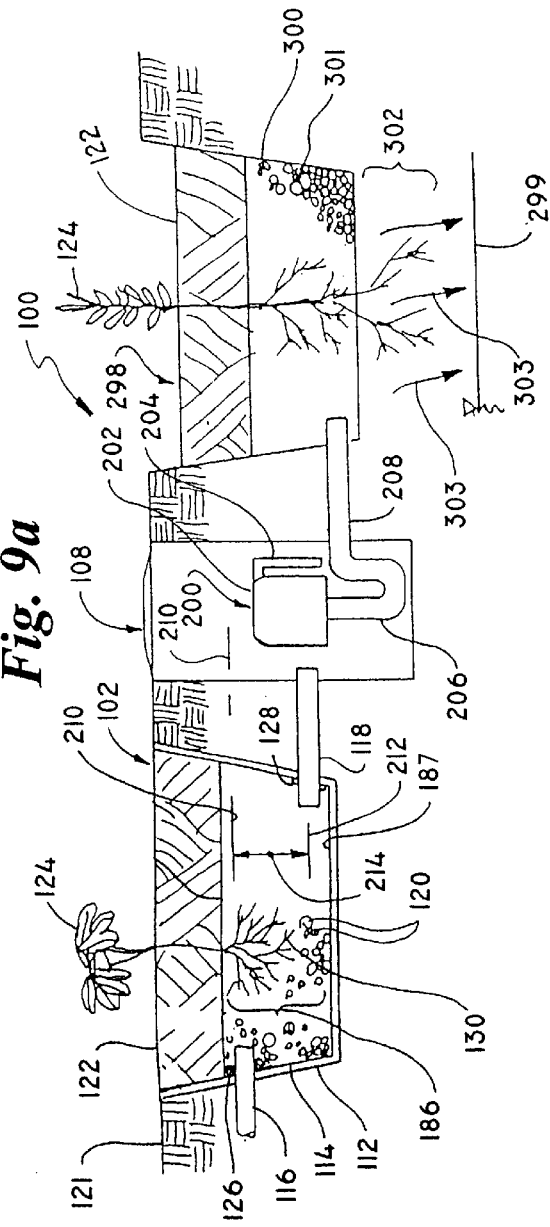
FIG. 9a depicts cross-sections of the primary treatment cell of FIG. 3, a dosing chamber, and an alternate embodiment of the present secondary treatment cell.

For example, in FIG. 9a, another embodiment of the present dosing siphon is depicted at 200 and includes a siphon bell 202, a siphon bell vent 204, a siphon leg (trap) 206, and a siphon discharge pipe 208. The dosing siphon 200 is configured to begin discharging wastewater from the dosing chamber 108 when a high wastewater level 210 is reached within the dosing chamber 108. The dosing siphon 200 continues discharging water from the dosing chamber 108 until the wastewater in the primary treatment cell reaches a low fluid level 212. This low fluid level 212 may coincide with the lowest fluid level at which the outlet 118 will drain water from the primary treatment cell 102.

Figure 9B:
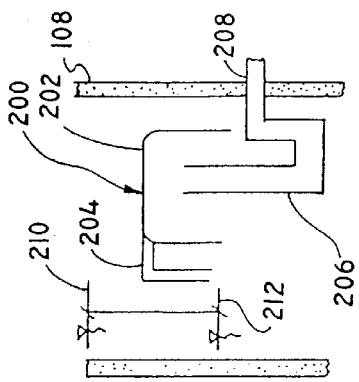
FIGS. 9b, 9c, and 9d illustrate principles of operation of one embodiment of a dosing siphon used in the present invention.
Figure 9C:
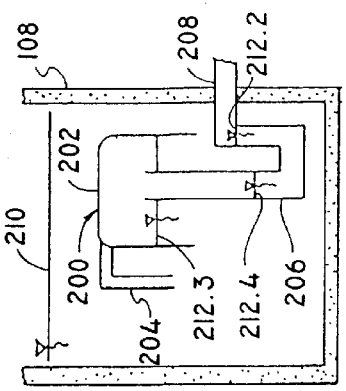
Figure 9D:
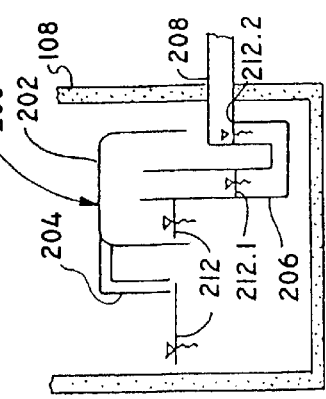

FIGS. 9b, 9c, and 9d further illustrate how treated wastewater levels in the present primary treatment cell may be controlled by the dosing siphon 200. In FIG. 9b, the treated wastewater level 212 represents the fluid level in the dosing chamber 108 and bell 202 at the lowest portion of the outlet 118 opening. The treated wastewater levels 212.1 and 212.2 in the siphon leg 206 are at lower levels than the level 212 because the discharge pipe discharges treated wastewater until the levels are as shown. The level of treated wastewater in the siphon chamber 108 has a maximum level 210. During the rise in the treated wastewater level, the bell vent 204 is closed off by the wastewater such that air cannot enter the bell vent 204. As the wastewater level rises, the water inside the siphon bell 202 becomes increasingly pressurized. As the treated wastewater in the siphon bell 202 becomes more pressurized, the wastewater therein rises to level 212.3 and the treated wastewater level in the dosing trap 206 lowers to level 212.4. Finally, when the treated wastewater level reaches the maximum level 210, pressure forces the treated wastewater in the siphon bell 202 into the trap 206 and the treated water is siphoned out the discharge pipe 208. Treated wastewater continues to be siphoned out of the dosing chamber 108 until the wastewater level falls below the vent 204. When the treated wastewater level falls below the vent 204, the vent becomes exposed to air. The air enters the vent 204 and breaks the siphon, thereby discontinuing discharge.

Thus, the maximum and minimum wastewater levels 210 and 212, respectively, within the present primary treatment cell may be regulated by altering the dosing siphon. Stated otherwise and referring to FIG. 9a, a primary treatment cell vertical dimension 214 as reflected by fluid levels in the present dosing chamber may be used to describe the distance between the maximum and minimum wastewater levels 210 and 212 regulated by the present dosing siphon. Adjusting minimum and maximum levels of wastewater in this manner is disclosed in Mote et al., Design and Performance of PVC Dosing Siphons, Transactions of the ASAE (1983), the contents of which are incorporated by reference hereinabove.

The dosing siphon is a passive system regulating fluid levels within the present primary treatment cell over time and is in fluid communication with the primary treatment cell such that the spaces between the bed medium particulates (pore volume) function as an extension of the dosing siphon. The fluid level of the primary treatment cell 102 can be regulated based on the rate of inflow from the inlet pipe 116 and outflow through the outlet pipe 118 as well as by the dimension and capacity of the dosing siphon in use. The dosing siphon requires no electricity and has no moving parts, thereby functioning economically, reliably, and for a lengthy period of time without maintenance. The dosing siphon may be used in lieu of pumps if the point of discharge is at a lower elevation than the outlet of the primary treatment cell, thereby eliminating the need to transfer liquids by using mechanical pumps.

Dosing siphons may be made from such materials as cast iron, fiberglass, polyethylene, and polyvinylchloride (PVC) (e.g., schedule 40). Cast iron dosing siphons are subject to corrosion. Fiberglass siphons do not corrode, but usually must be fastened in place because of their light weight and buoyancy. The design of the primary treatment cell may accommodate one or more dosing siphons to advantageously transfer treated or partially treated wastewater from the primary treatment cell to, e.g., the secondary treatment cell in the present system. One suitable dosing siphon is available from Fluid Dynamics, Inc. of Steamboat Springs, Colo. as model 417.

Figure 10:
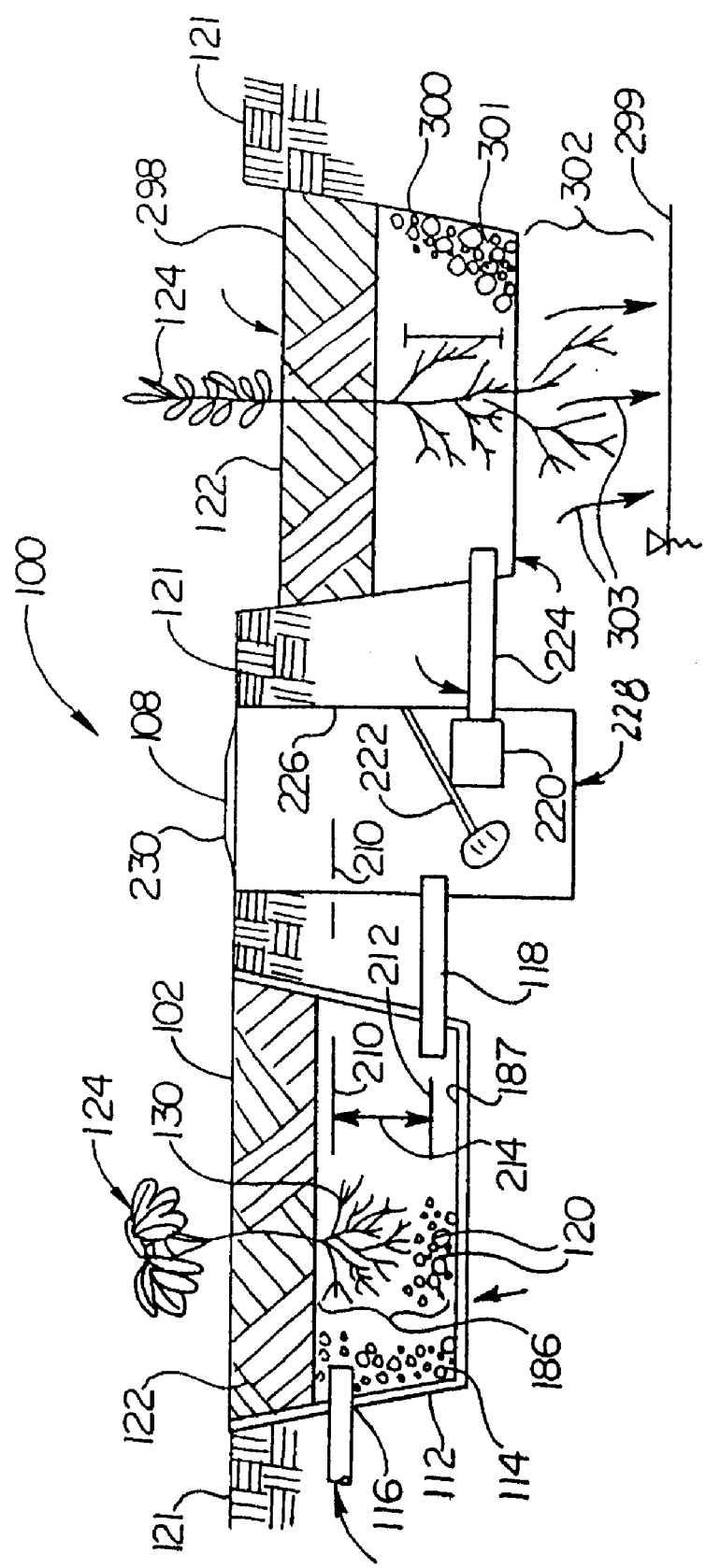
FIG. 10 depicts another embodiment of the present fluid level control system.

Referring to FIG. 10, another embodiment of the present fluid level control system is depicted as an electric pump 220, which is activated, and deactivated, by a float 222. The float 222 may be attached to a wall 226 of the dosing chamber 108 or may be directly attached to the pump 220. A person of ordinary skill in the art will readily comprehend how to adjust and locate the float 222 so that fluid levels within the primary treatment cell 102 are maintained, e.g., between the upper and lower fluid levels 210 and 212, hence within the primary cell vertical dimension 214.

It is also contemplated that this invention could be constructed with yet another fluid level control system such as a standpipe (not shown). The standpipe would then fix the water level within the primary treatment cell. Adjusting the water level would require altering the height of the standpipe or attaching a float valve to the end of the standpipe. However, unless a float valve or the like were operably present, a calculated raising and lowering of the fluid levels within the present primary treatment cell (described hereinbelow) would not usually occur if a standpipe were used in lieu of a dosing siphon or a mechanical pump.

The dosing chamber 108 may be impermeable (e.g., include an impermeable liner 228). Alternatively, if the present primary treatment cell treats wastewater to a desired extent, the present dosing chamber may be more or less permeable to allow egress of treated wastewater into the soil. The dosing chamber 108 may further include a cover 230 for access.

The present fluid level control system (e.g., dosing siphon, pump-float combination) determines fluid levels within the present primary treatment cell. More specifically, the present fluid level control system periodically ideally lowers these fluid levels to a desired and predetermined level. This calculated lowering of fluid levels within the present primary treatment cell enhances the root growth of the wetland vegetation within the primary treatment cell. As the fluid level is lowered and slowly rises over a sufficient period of time, the root structure of the wetland vegetation grows deeper into the bed medium in response to the lower wastewater level. Moreover, the aerobic bacteria present at these lower levels are able to use and store atmospheric oxygen during periods of lower water levels. These "oxygenated" aerobic bacteria tend to function more efficiently once the water levels again cover the bed medium. Thus, through controlled variation of fluid levels within the present primary treatment cell, propagation of wetland root structure and bacterial decomposition can be optimized, thereby increasing the effectiveness and efficiency of the present system to remove pollutants from wastewater.

In a preferred embodiment of this invention, the efficiency of pollutant removal is also related to the presence of alternating aerobic zones and anaerobic zones. The aerobic zones are established by any of the embodiments of the present forced aeration system. Natural, but limited, aerobic zones occur in existing subsurface flow wetlands by oxygen transport via passive atmospheric diffusion or oxygen release from wetland plant root tissues. The oxygen released by root tissues is previously translocated by the wetland plants to the root tissues. However, these naturally occurring aerobic zones are very limited in scope and cannot by themselves support sufficient populations of aerobic bacteria for efficient pollutant removal. Thus, it is advantageous, especially when nitrogen compounds are present as pollutants, to construct the present system with one or more alternating aerobic zones 250 and one or more anaerobic zones 252 by using an embodiment of the present forced aeration system (FIG. 6). Whereas aerobic zones have high oxidation-reduction potentials, anaerobic zones have relatively low oxidation-reduction potentials. Thus, alternating anaerobic and aerobic zones can be extremely advantageous to pollutant removal.

Treating wastewater with nitrogenous compounds typically involves ammonification, nitrification, and denitrification. Ammonification involves transforming organic nitrogenous compounds into inorganic ammonium ($NH_4^+$) compounds. High concentrations of ammonium compounds can be toxic to both plants and microbes. However, this transformation is a necessary precursor to subsequent nitrogen removal mechanisms. Specific aerobic bacterial species are quite effective in oxidizing ammonium compounds into nitrate compounds which can be either taken up by the wetland plants as nutrients or further used (metabolized or catabolized) by bacteria. Then, bacteria in subsequent anaerobic zones denitrify the nitrates. Upon denitrification, the nitrogen compounds are transformed into nitrogen gas or gaseous nitric oxide to be liberated to the atmosphere. Thus, nitrogen is effectively removed from the wastewater being purified.

Nitrification is considered to be a process of bacterial enzymatic oxidation and is further considered to be the result of two steps. Each step is hypothesized to be conducted by a distinct bacterial group. Without limiting the present invention to any specific theory, the first step is thought to be oxidation of ammonium ions to nitrous acid:

$$2NH_4^+ + 3O_2 \rightarrow 2NO_2^- + 2H_2O + \text{Energy}. \tag{1}$$

In equation (1) nitrous acid is produced by one group of aerobic bacteria. The second step is thought to be oxidation of the nitrous acid:

$$2NO_2^- + O_2 \rightarrow 2NO_3^- + \text{Energy}. \tag{2}$$

In equation (2), the nitrous acid is further oxidized into nitrate by another group of aerobic bacteria. Collectively, the nitrifying bacteria are called nitrobacteria. Of these, the Nitrosomonas are thought to be involved in the conversion of ammonium ions into nitrate ions. The bacteria oxidizing nitrites to nitrates are usually designated Nitrobacter. However, other organisms, e.g., heterotrophic bacteria, fungi, and actinomycetes, are probably able to produce nitrate salts by these or other pathways. The biochemical reduction of nitrate nitrogen into gaseous compounds is termed denitrification. Generally denitrification proceeds along the following pathway:

$$2NHO_3 \rightarrow 2NHO_2 \rightarrow N_2O \rightarrow N_2 \rightarrow 2NO. \tag{3}$$

Thus, the transformations of nitrates to nitrites, nitrites to nitrous oxide, nitrous oxide to elemental nitrogen, and elemental nitrogen to nitric oxide occur. Organisms, including bacteria, which reduce these compounds, are thought to be anaerobic.

Similarly, alternating anaerobic and aerobic zones have been shown to benefit the growth of bacteria, which remove phosphorus from the water. See, e.g., Randall et al. (Editors), "Design and Retrofit of Wastewater Treatment Plants for Biological Nutrient Removal," Water Quality Management Library, Technomic Publishing Co., Inc., Lancaster, Pa. (1992), hereby incorporated by reference.

FIG. 6 depicts one embodiment of the present primary treatment cell with alternating aerobic 250 and anaerobic 252 zones. However, other embodiments of the present forced aeration system (described above) are also capable of establishing alternating aerobic and anaerobic zones as wastewater being treated in the present primary treatment cell flows substantially horizontally therethrough. In the embodiment depicted in FIG. 6, atmospheric air is bubbled from proximate the bottom of the primary treatment cell 102, through the bed medium 120 (hence the root structure), to the top of the wastewater level (e.g., 210, FIG. 9*a*). The oxygen concentration within the wastewater being treated in the aerobic zones increases because the wastewater dissolves oxygen from the air as the air bubbles rise through the wastewater column. By contrast, the wastewater being treated in the anaerobic zones has dissolved oxygen at concentrations too low to sustain aerobic bacterial pollutant decomposition and a generally negative oxidation-reduction potential.

It may often be advantageous to limit the amount of aeration—not only physically within aerobic zones throughout the primary treatment cell 102—as well as to vary the oxygen gradient within the water. The oxidation gradient thus varied, may promote microbial diversity and oxygen transfer efficiency, thus, better stimulate the types of chemical transformations described above. The aeration process has many other benefits to the invention. One of the primary benefits of aeration is that the aeration accelerates nitrification. In the case of wastewater, such as domestic sewage, ammonia is advantageously nitrified by transforming ammonium ions into nitrite ions, then further transforming nitrate ions into nitrate ions using different bacterial populations within the aerobic and anaerobic zones.

In the primary treatment cell embodiment with forced bed aeration depicted in FIGS. 5 and 6, the depth of the primary treatment cell can efficiently reach five feet or more below ground surface. In this particular embodiment, the primary treatment cell depth is limited only by the depth at which it is no longer cost-effective to force air to a location proximate the bottom of the primary treatment cell for aeration. This depth is generally considered to be between about 20 and 25 feet.

Figure 11:
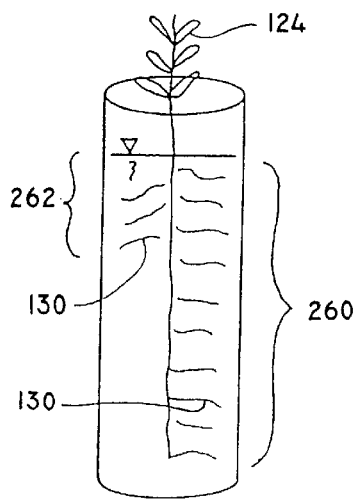
FIG. 11 is a comparative illustration of the effect of aeration on root depth.

Aeration of the present primary treatment cell (as well as lowering the wastewater level) also promotes a greater rooting depth in the wetland flora 124. FIG. 11 depicts root depths in primary treatment cells with 260 and without 262 aeration. Under forced bed aeration, oxygen is transported into the treatment bed to the vicinity of the plant roots. Therefore, the plants have a lower concentration gradient to overcome when translocating oxygen from the leaves, through the stems, and into the roots. With a lower concentration gradient to overcome, less metabolic energy is needed to support root tissue growth and development. Consequently, the plant can support more roots at a greater depth than could be supported in wetland systems of the prior art without forced bed aeration. The beneficial aspects of aeration and calculated raising and lowering of the water level for a sufficient period of time (termed drawdown in this study) are further disclosed in Lockhart, A. M., "A Comparison of Constructed Wetlands Used to Treat Domestic Wastes: Conventional, Drawdown, and Aerated Systems," M. S. Thesis, University of Iowa (1999), hereby incorporated by reference. In this study, wetland plants were grown in cells with gravel as a medium and a continuous flow of wastewater. A control set of cells received no aeration or drawdown. A second set of cells was aerated, but not subjected to the drawdown protocol. A third set of cells was subjected to the drawdown protocol, but not aerated. The entirety of the bed medium subjected to aeration was clear and no dark zones or build up was noted. Dark zones are residue from anaerobic bacteria. Thus, the entirety of cells subjected to aeration were provided with an aerobic environment. Black zones were present throughout the control cells to indicate that the entirety of the control cells were anaerobic. The cells undergoing the drawdown had black zones below the lowest fluid levels attained during drawdown, but were clear above the lowest fluid levels (drawdown zone). Therefore, the portion of the cells exposed to air in the drawdown zone during a drawdown event was aerobic and the portion of the cells not exposed to air during a drawdown event (below the drawdown zone) was anaerobic in nature. Dark zones were present throughout the bed medium, except within the rhizospheres of control cells. Thus, sufficient oxygen was not present in the rhizospheres (proximate roots) of the control cells to produce aerobic conditions.

In the conventional cells, the tubers and roots (of *Typha latifolia*) grew both vertically and horizontally to a limited extent. By contrast, rooting patterns of aerated cells were deep and extensive. The tubers and roots grew down vertically and were present deeper within the medium than was the case in the control cells. In the drawdown cells the cattail tubers and roots were more extensive than those of the control cells only within drawdown zones. The tubers eventually grew below the drawdown zone to a limited extent.

Without wishing to be bound by any specific theory, it is believed that oxygen supply determined rooting patterns. The plentiful supply of oxygen in aerated cells stimulated extensive and pervasive tubers and root growth. The more limited supply of oxygen in drawdown cells stimulated root and tuber growth only in portions where sufficient oxygen was present (drawdown zones). By contrast, the only oxygen supply for the control cells was from the very limited amount diffusing from the atmosphere at the fluid-air interface. Therefore, tubers and roots grew within this very limited volume. Thus, as compared to a nonaerated control not subjected to a drawdown protocol, aeration and a calculated raising and lowering of water levels stimulates more extensive and pervasive tuber and root growth.

Continuous aeration may not always be necessary. Once the oxygen content in the wastewater being treated in the primary treatment cell reaches a generally saturated concentration, further aeration is unnecessary and is thus inefficient. Therefore, aeration using oxygen sensors, timers, or other means to regulate aeration (described hereinabove) is contemplated in the forced aeration embodiments of the present invention.

As previously described, a dosing siphon transfers water from the present primary treatment cell to, e.g., the secondary treatment cell 104. The dosing siphon used thusly can control the wastewater level in the present primary treatment cell. Controlling the primary treatment cell water level has important implications in the operation of the present invention. The calculated lowering of wastewater levels in the present primary treatment cell (e.g., by the dosing siphons described hereinabove) tends to increase natural root growth and further stimulates aerobic bacterial growth as well. Stimulating root growth further enhances the pervasiveness of root tissue throughout the bed medium. Increased root tissue in the bed medium increases the oxygen content of the wastewater and also increases the porosity of the bed medium. Moreover, the presence of atmospheric oxygen at low wastewater levels stimulates the growth of aerobic bacteria proximate the bed medium in places where the aerobic bacteria would not be as plentiful otherwise.

With reference to the embodiment depicted in FIG. 3, wastewater (effluent) enters the primary treatment cell 102 via inlet 116 after solids have been allowed to settle out in the septic tank 56. As the wastewater flows between spaces in the bed medium from the inlet 116 to the outlet 118, the wastewater flows substantially horizontally as it passes through the alternating aerobic and anaerobic zones. Certain compounds (e.g., nitrates and phosphates) in the wastewater are taken up by the roots as nutrients. Nitrogenous compounds are changed by mostly bacterial enzymatic actions from organic to ammonium, from ammonium to nitrate, and from nitrate to gaseous nitrogen and nitric oxide. Other pollutant compounds are transformed into less objectionable compounds by other bacteria or other microflora. Some of the water is also removed from the primary treatment cell when it is taken up by the plants and released to the atmosphere as evapotranspiration.

After the wastewater has been treated by the primary cell 102, the present invention contemplates embodiments to further treat the treated wastewater for release into the environment. Referring to FIG. 3, one exemplary secondary treatment cell 104 includes a closed, preferably cement, structure 280 with a surface accessible top cover panel 282 to facilitate medium replacement. A bed medium 284 is present within the embodiment depicted. Also present in this embodiment are an inlet 290, and an outlet 292. The inlet 290 receives treated wastewater from the siphon discharge pipe 196 and releases the treated wastewater proximate the bottom of the secondary treatment cell 104 through a series of slits or apertures 293. The treated wastewater then flows through the bed medium 284 and out of the secondary treatment cell 104 through the outlet 292 to a discharge area 294. Alternatively, the secondary treatment cell itself is porous or permeable in nature, thereby allowing release of further treated wastewater into a subterranean discharge area 296. The bed medium 284 of the secondary treatment cell 104 may include any material disclosed with respect to bed medium 120 and further may contain substances for removal of phosphorus, or other compounds through chemical absorption and to neutralize acid pH as disclosed above. Thus, any combination of primary and secondary cells, including either or both with chemical-absorbing and/or neutralizing capabilities, can be advantageously configured to adapt to the types of pollutants to be treated.

Another embodiment of the present secondary treatment cell is shown in FIGS. 9a and 10 at 298 and includes a permeable liner or structure 300, a bed medium 301, a mulch layer 122, and a plurality of wetland vegetation 124 rooted in the bed medium 301 and growing through the mulch layer 122. The permeable liner 300 enables infiltration of treated wastewater to the soil profile 302 below the secondary treatment cell 298, as shown by arrows 303, into the underlying aquifer 299. The bed medium 301, mulch layer 122, and wetland vegetation 124 may be similar or identical to embodiments described hereinabove and may perform similar functions in further purifying wastewater. An outlet (not shown) may be present to convey further treated wastewater for disposal, e.g., in drain fields. A fluid level control system (e.g., a dosing chamber and siphon) may also be present to control wastewater levels in this embodiment.

Figure 12:
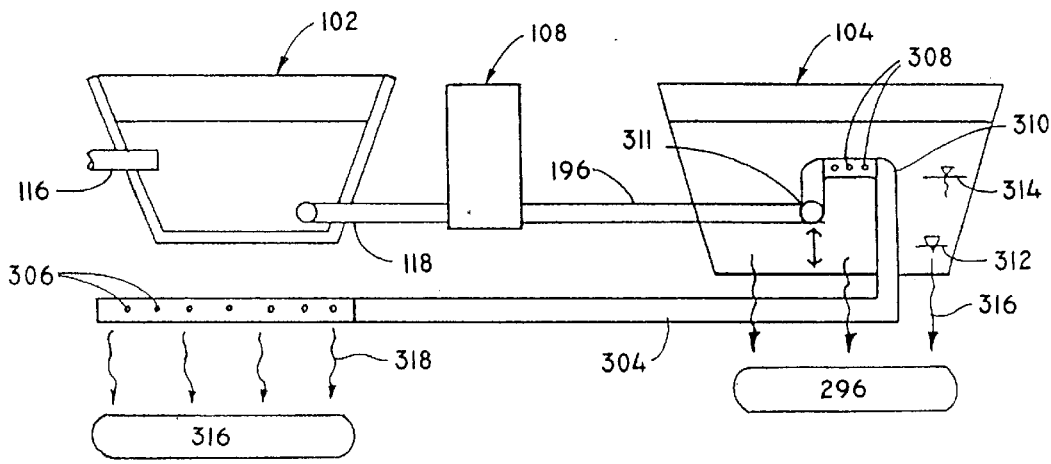
FIG. 12 is an alternate embodiment of the present invention, illustrating an extension of the infiltration area beneath the primary treatment cell.

Yet another embodiment of the present invention further extends the infiltration area from the present secondary treatment cell to below the primary treatment cell 102. Referring to FIG. 12, a pipe 304 includes apertures 306 and 308. Apertures 306 are located beneath the primary treatment cell 102 and apertures 308 are located in an upper portion 310 of the pipe 304 within the secondary treatment cell itself. So that at least some of the wastewater being treated by the secondary treatment cell 104 will pass through the pores between the bed medium particulates, fluids entering the secondary treatment cell 104 flow from an inlet 311. Treated wastewater levels may fluctuate between a lower level such as level 312 and a higher level such as (exit) level 314. At level 314, these fluids can enter the pipe 304. From the exit level 314, the fluids flow through the pipe 304 and exit via the apertures 306 into another subterranean infiltration area 316 located below the present primary treatment cell and as indicated by arrows 318. Alternatively, (or in addition to the pipe 304) a porous and/or permeable bottom to the secondary treatment cell 104 may allow further treated wastewater to egress into the underlying infiltration zone 296 as indicated by arrows 316. In this way, the soil beneath primary treatment cell can be used as a back-up infiltration area if, e.g., hydraulic loading into the secondary treatment cell exceeds the infiltration capacity of other discharge areas. Moreover, this embodiment, or variations of this embodiment, can be advantageous when limited physical space exists at the installation site.

Figure 13:
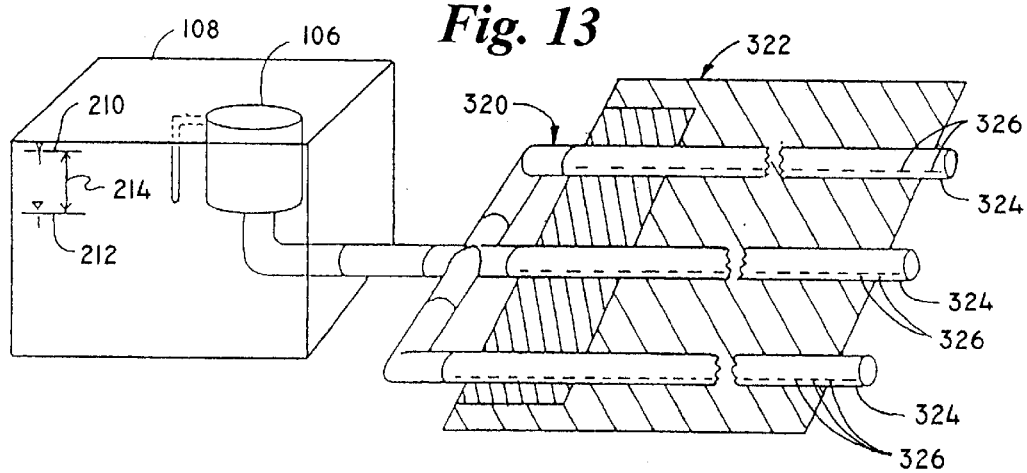
FIG. 13 illustrates the dosing chamber of the present invention directly connected to a drainfield.

When the primary treatment cell sufficiently purifies wastewater, the secondary treatment cell may not be necessary. Referring to FIG. 13, the dosing siphon 106 discharges treated o wastewater directly into a drainage system 320 installed within a drainfield (or mound) 322. The drainage system 320 includes a system of pipes 324 with perforations 326 and may be similar to drain systems commonly used in connection with septic tanks.

Referring to FIG. 14, another embodiment of the present system is indicated generally at 400 and includes a septic tank 402, a filter tank 404, a recirculation tank 406, a vertical flow constructed wetland cell (reactor) 408, a dosing tank 410, and one or more embodiments of a disposal system indicated generally at 412. The septic tank 402 receives sewage from the sewer line 420. After the sewage flows into the septic tank 402, solids are allowed to settle. The separated, liquid wastewater (effluent) flows through a line 422 to the filter tank 404. In the filter tank 404, a filter 424 is used to remove suspended solids from the wastewater. A return line 426 conducts returned treated wastewater to the filter tank 404 from the vertical flow wetland 408. Thus, in the filter tank 404, wastewater from the septic tank 402 is mixed or blended with treated wastewater conveyed from the vertical flow wetland 408. The filter tank 404 therefore serves two purposes. One purpose is to filter out any biosolids or bacterial slimes from the vertical flow wetland 408 as well as additional solids from the wastewater flowing from the septic tank 402. The other purpose is to allow nitrified effluent from the substantially aerobic vertical flow wetland 408 to mix with the substantially anaerobic wastewater from the septic tank 402. The treated wastewater from the vertical flow wetland 408 usually has a low biological (biochemical) oxygen demand (BOD) and most, if not all, of the nitrogen in the treated wastewater from the vertical flow wetland 408 has been converted to nitrate form. When the nitrified, treated wastewater from the vertical flow wetland 408 is blended with the substantially anaerobic wastewater from the septic tank 402, the available dissolved oxygen in the treated wastewater is considerably lowered. Moreover, the wastewater from the septic tank 402 provides a carbon source for anaerobic metabolism. Thus, an ideal environment is created for denitrifying nitrates, i.e., converting nitrates to gaseous nitrogen forms under anaerobic conditions. The gaseous nitrogen forms are then vented to the atmosphere and eliminated from the system. Thus, this embodiment of the present system is extremely effective in removing total nitrogen from wastewater. A suitable embodiment of the filter 424 is Model A-300 HIP and is available from Zabel Environmental Technology, Crestwood, Ky.

From the filter tank 404, the effluent is conveyed by being pumped or gravity flowed through the line 427 to the recirculation tank 406. A pump 428 in the recirculation tank 406 pumps the blended wastewater to the vertical flow wetland 408 via line 430. A wastewater supply system 432 may be considered to include the filter tank 404, recirculation tank 406, and/or pipes and tubing conveying wastewater to the vertical flow wetland 408.

One embodiment of the vertical flow wetland cell 408 is depicted in FIGS. 15, 16a, 16b, and 16c and includes an outer structure 440, an insulative layer 442 and an impermeable liner 444. In this embodiment, the outer structure 440 includes ¾ inch, pressure-treated plywood. The insulative layer 442 may include such materials as Styrofoam™ and may be about two inches in thickness. The impermeable liner 444 may be made of materials such as 30 mil PVC sheeting. The impermeable liner 444 extends around the interior of the inner volume (or basin) defined by the outer structure 440 and the insulative layer 442. Atop the impermeable liner 444 is a series of drain lines 446 embedded within one embodiment of a bed medium such as a drainfield bed medium 448 (e.g., about 30 inches in depth). Atop the bed medium 448 is a series of aeration lines 450. Another bed medium embodiment such as an upper bed medium 452 is disposed above the aeration lines 450. The drainfield bed medium 448 particulates may be larger (i.e., have a larger average maximum cross-sectional dimension such as a diameter) than a similar dimension of the upper bed medium 452 particulates to promote drainage into the drain lines 446. Exemplary materials suitable for the drainfield bed medium 448 and the upper bed medium include gravel or plastic packing with respective dimensions such as between about one inch and two inches (±0.5 inch) and between about one inch and one and one-half inch (±0.5 inch). A series of wastewater distribution lines 454 is disposed above the upper bed medium 452. An optional mulch layer 456 overlays the upper bed medium 452 and the wastewater supply lines 454. Materials suitable for the mulch layer 456 may be similar or identical to those disclosed with respect to mulch layer 122, hereinabove. Vegetation 458 is rooted in the upper and drainfield bed media 452 and 448 and extends through the mulch layer 456. The vegetation 458 may include the wetland species described hereinabove or may include other species which do not require continually wet or saturated soils. An air supply (source) such as a blower 460 (FIG. 14) supplies air to the aeration lines 450 via a series of air supply lines 462. One suitable blower is a model DR303 and is available from Ametek-Rotron, Inc., Saugerties, N.Y.

In one embodiment, two rows of holes 468 are drilled in the drain lines 446. These holes 468 may have diameters of about inch and be spaced apart about one foot on center. The rows of holes 468 may be oriented at about 4 and 8 o'clock (e.g., about 120° apart) as depicted in the inset of FIG. 16a. The series of aeration pipes 450 likewise define one or more rows of holes 470. Typical hole 470 dimensions in the aeration lines (pipes) would be inch in diameter or less, spaced about every two feet. Alternatively, drip emitter tubing may be used. One suitable drip emitter is "Wasteflow Classic" (part number WF-16-4-24), available from Geoflow, Inc., Charlotte, N.C. This emitter is disclosed in above-referenced U.S. Pat. No. 5,332,160 and in U.S. Pat. No. 5,116,414, hereby incorporated by reference. Dimensions and orientation of holes 470 may be similar to those of holes 468, discussed above. The wastewater supply lines 454 similarly define a row of holes 472. The row of holes 472 is oriented generally down, the holes being about inch in diameter and spaced apart about three feet in this embodiment. Alternatively, the diameters of the holes may gradually increase as they become farther from the line 430 to ensure that the wastewater from the recirculation tank 406 is distributed substantially evenly over the present vertical flow wetland. A valve 474 may be present to control the wastewater flow from other wastewater supply pipes branching from wastewater supply lines 454 or to other wastewater distribution lines branching from the wastewater distribution line 454 (FIG. 16c) and to allow the wastewater distribution lines 454 to be flushed. The distribution lines 454 distribute the wastewater across the top of the vertical flow wetland (basin). After the wastewater has been pressure-distributed across the top of the basin, the wastewater trickles down via gravity through the upper bed medium 452 and the drainfield bed medium 448. The drain lines 446 return the flow of treated wastewater back into the filter tank 404. Suitable materials and dimensions for the drain lines 446, and wastewater supply lines 454 include four inch schedule 40 PVC tubing and 1–2 inch schedule 40 PVC tubing, respectively. Of course, a person of ordinary skill in the art will recognize that other materials and/or dimensions may be suitable as well. A wastewater return system 475 may arbitrarily be considered to include the return line 426, drain lines 446 and all structures conveying treated wastewater from the wetland cell 408.

One substantial difference between the manner the wastewater is treated in the vertical flow constructed wetland embodiment (designated as 400) as compared to previous embodiments of this invention is that the basin of this vertical flow wetland embodiment is not completely filled with water (unsaturated). Thus, the unsaturated, generally vertical, flow is characterized by the wastewater being dripped or streamed through the present bed medium in fluid quantities not sufficient to completely fill the spaces between the bed medium particulates. Thus, atmospheric gases are present substantially throughout the unsaturated vertical flow wetland 408, e.g., present in portions of the upper bed medium 452 and the drainfield bed medium 448. In addition to the unsaturated bed media, there are two additional ways of aerating the present system. The first way is via the air supply blower 460, air supply lines 462, and aeration lines 450. The aeration lines 450 are typically perforated to deliver a supply of ambient air throughout the bed media in the wetland cell basin. In contrast to previous embodiments, alternating aerobic and anaerobic zones need not be present within the present system. However, wastewater being treated is conveyed through an aerobic environment provided by the present wetland cell and anaerobic environment in the septic tank, filter tank and recirculating tank. The blower 460 may continuously supply air. However, the blower 460 may include a timer switch 461 to periodically actuate the blower as needed. One suitable blower is DR083 and may be obtained from Ametek-Rotron, Inc.

After being cycled between the filter tank 404, recirculation tank 406, and vertical flow wetland 408, the treated and blended wastewater is conveyed by gravity or pumped to the dosing tank 410 via line 464. One embodiment of the dosing tank 410 conveys treated wastewater to the disposal system 412 via such means as a pump 480. One suitable embodiment of the pumps 428 and 480 is a SHEF 50, which may be obtained from Hydromatic, Inc., Ashland, Ohio. A dosing siphon, stand pipe, or the like may also be used to convey treated wastewater from the dosing tank 410 to the disposal system 412. Treated wastewater may also be conveyed directly from the recirculating tank 406 to the disposal system 412 in some embodiments.

The disposal system 412, by way of illustration and not limitation, may include a trench system 490, a drip irrigation system 492, an infiltration bed (or mound) 494, or discharge to a surface body of water 496. It should be noted that the separate septic tank 402, filter tank 404, recirculation tank 406, and dosing tank 410 may all be combined into one or a few tanks with a variety of compartments. These tanks may be constructed of fiberglass treated to become impermeable, another synthetic resin, concrete, or other suitable materials. These tanks may typically be substantially disposed within the earth.

A system substantially similar to the system 400 was installed near Blaine, Minn. In this case, the filter tank and recirculation tank were a single structure with two compartments. The wastewater entering the filter tank and the treated wastewater being conveyed from the dosing tank were sampled at two day intervals. Results from analysis of these samples are shown in Table 1, below. Carbonaceous biological oxygen demand and fecal coliform counts were determined at each sampling. Removal of carbonaceous biological oxygen demand by this system varied from 97% to 99%. Fecal coliform removal was in excess of 98%. Total nitrogen removal was 89% and 86%. The fecal coliform readings usually met standards for water used for swimming (usually 100/100 m). The highest fecal coliform reading was close to the standards usually present for disinfected wastewater (usually 200/100 m). One fecal coliform reading met the standard for drinking water (usually 4/100 m).

TABLE 1

Wastewater Pollutant Measurements From Ingressing Wastewater and Egressing (Treated) Wastewater Treated by a Vertical Flow Constructed Wetland Wastewater Treatment System.

| Sampling Date | BOD-C[1] In[4] | BOD-C[1] Out[5] | Fecal Coliform[2] In[4] | Fecal Coliform[2] Out[5] | Total N[3] In[4] | Total N[3] Out[5] |
|---|---|---|---|---|---|---|
| Feb. 7, 2000 | 139.0 | <2.0 | >10,000 | 224 | 47.7 | 5.4 |
| Feb. 9, 2000 | — | 3.5 | >10,000 | 34 | — | — |
| Feb. 11, 2000 | 248.0 | 3.0 | >10,000 | 14 | 31.2 | 4.4 |
| Feb. 13, 2000 | — | <1.0 | >10,000 | 4 | — | — |
| Feb. 14, 2000 | — | 1.1 | >10,000 | 6 | — | — |

[1]BOD-C. Carbonaceous biological oxygen demand, measured as mg/ and as determined by EPA Method 354.1.
[2]Fecal Coliform measured as number per 100 m and determined by method 9221E.
[3]Total N, Kjeldahl Nitrogen measured as mg/ by EPA Method 351.1.
[4,5]Readings of wastewater entering the filter tank and exiting the dosing tank, respectively.

FIGS. 17, 18, 19, and 20 depict an alternate embodiment of the present invention as disclosed above. This alternate embodiment is generally indicated at 500 and includes a tank 502 and a vertical flow wetland unit 504. The tank 502 includes an inlet 512, a septic (settling) chamber 514, and a recirculating chamber 516. The septic chamber 514 includes a plurality of baffles such as baffles 520 and 522 to facilitate settling out solids and is in fluid communication with the recirculating chamber 516 via a settling chamber outlet 524. The recirculating chamber 516 includes a manhole unit 530, which extends through the vertical flow wetland unit 504 as a manhole riser 532. An access cover 534 normally covers the manhole riser 532. The recirculating chamber 516 may include a recirculating pump 540. The recirculating pump 540 pumps wastewater effluent being treated through a filter (or screen) 542 through a pump outlet 544. The outlet 544 terminates in another forced air source such as an air injector 546. The air injector 546 aspirates air into the wastewater as the wastewater is pumped therethrough. One suitable air injector is disclosed in U.S. Pat. No. 4,123,800, hereby incorporated by reference. From the air injector 546, the aerated wastewater enters a tee 547. From the tee 547, the effluent is pumped through one or both diaphragm valves 548a, b. From the diaphragm valve 548a, the aerated wastewater is pumped through an outlet line 550 to a distribution tube 576. The distribution tube 576 is arbitrarily considered to be a component of the vertical flow wetland unit 504, and is discussed below. A float-operated solenoid valve 560 is present between the tee 547 and the diaphragm valve 548b. From the diaphragm valve 548b, the aerated effluent is conveyed through an elbow joint 561 into a disposal pipe 562, from which the aerated and potentially treated effluent is conveyed to a disposal field. A disposal return 564 conveys treated wastewater back into the recirculating chamber 516. A float-operated solenoid to determine when treated wastewater will be conveyed to a disposal field has the advantages of being relatively simple in design and function and usually enables the present system to treat and dispose wastewater. This float-actuated system may be termed "on-demand based." An on-demand based system actuates conveyance to disposal when the treated wastewater reaches a predetermined volume—regardless of the timing and frequency of conveyances. Thus, a relatively large amount of treated wastewater may be conveyed to the disposal in a short amount of time, potentially overloading the disposal.

Under certain circumstances an alternate method of determining when treated wastewater will be conveyed to disposal is preferable. One alternate method is a controller logic unit L. One such unit would route treated wastewater to the disposal upon a predetermined number of pump activation iterations (e.g., every fifth, seventh, or tenth). In another embodiment, the number of iterations would be determined by such factors as wastewater oxygen concentration. Another embodiment would either be totally time-based or would be a combination of time-based and wastewater characteristics (e.g., dissolved oxygen concentration). These criteria for determining when to convey treated wastewater to disposal would have the advantage of better spacing treated water conveyances to the disposal over time and would have a lower likelihood of overloading the disposal system.

Figure 18:
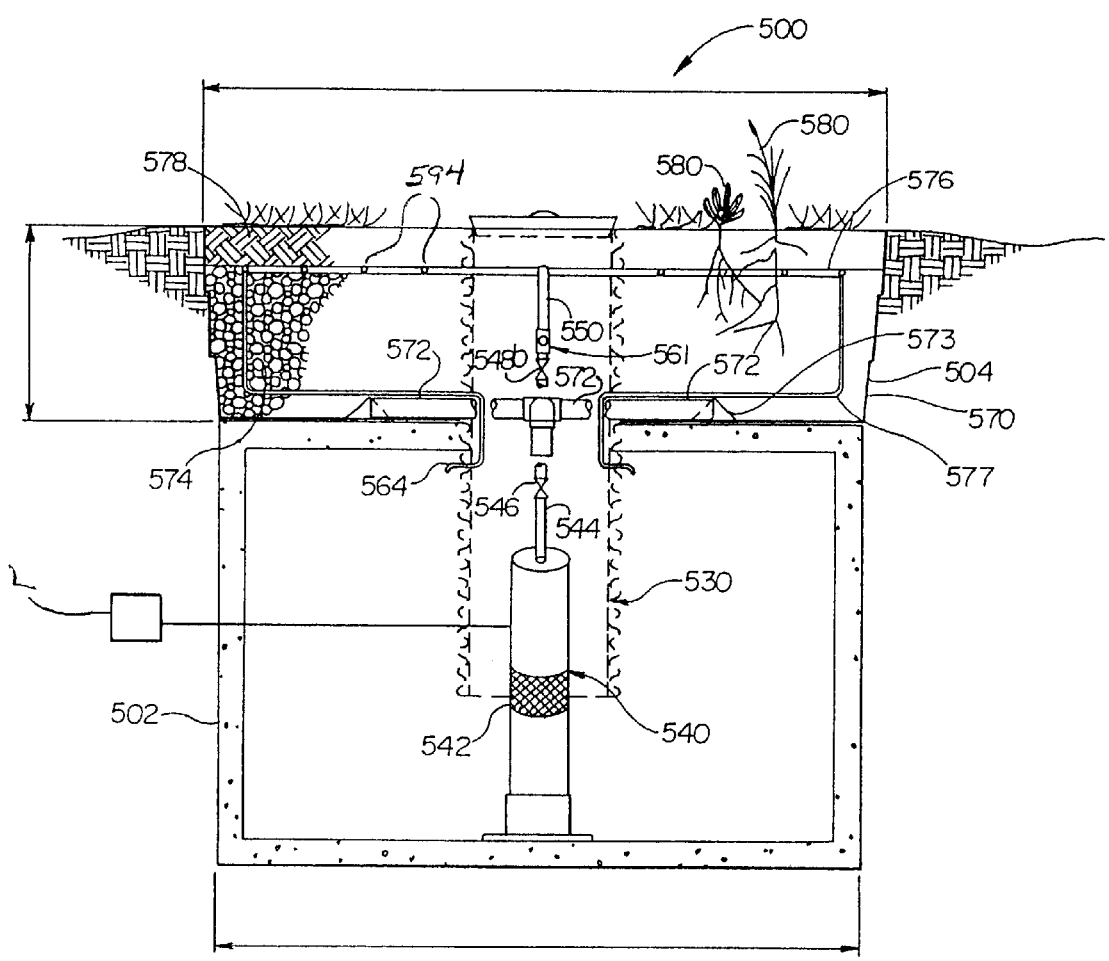
FIG. 18 is a cross-section depicting the vertical wetland cell and recirculating chamber of FIG. 17.
Figure 19:
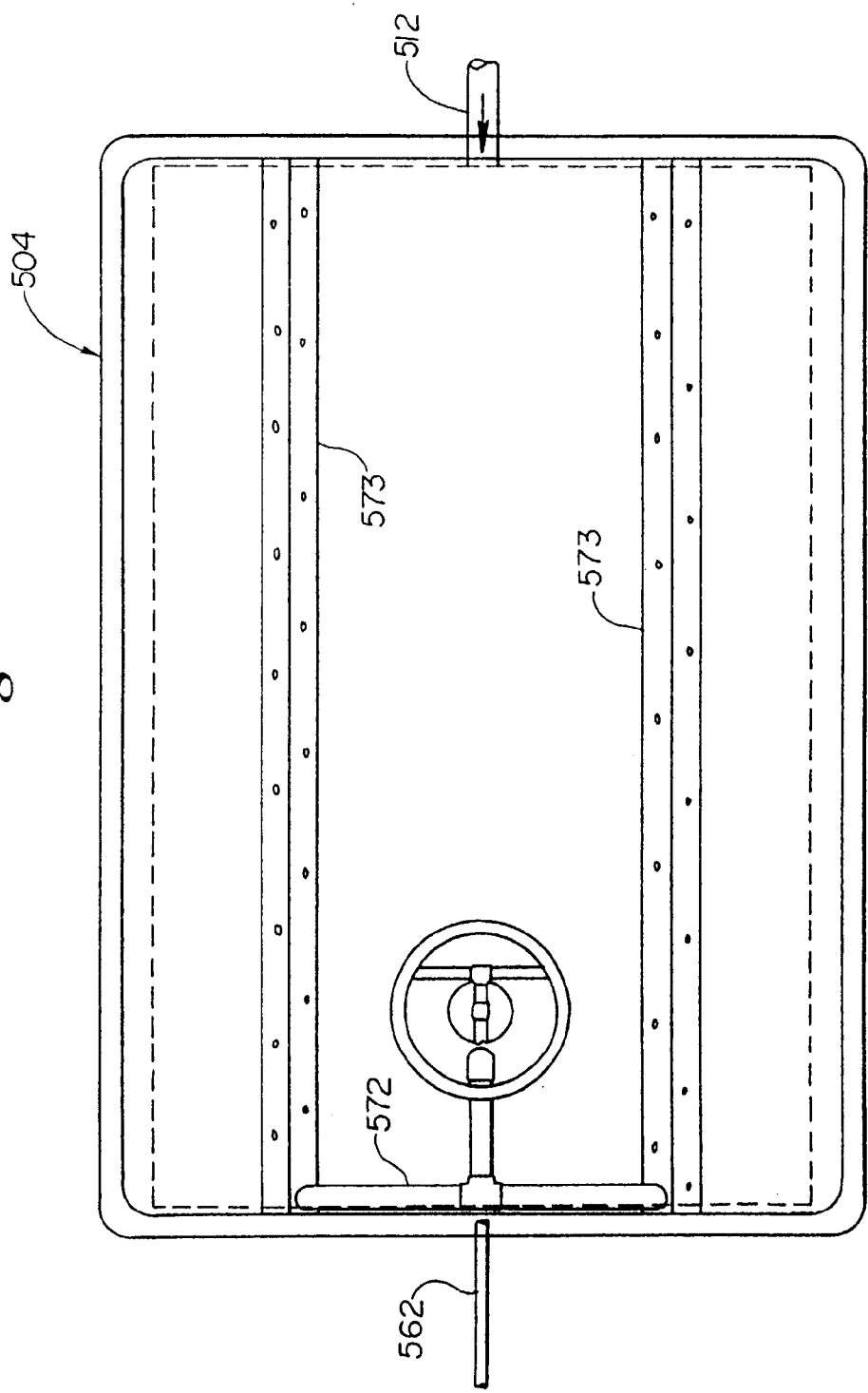
FIG. 19 is a plan view of the vertical flow wetland unit of FIG. 17 showing the wastewater return system thereof.
Figure 20:
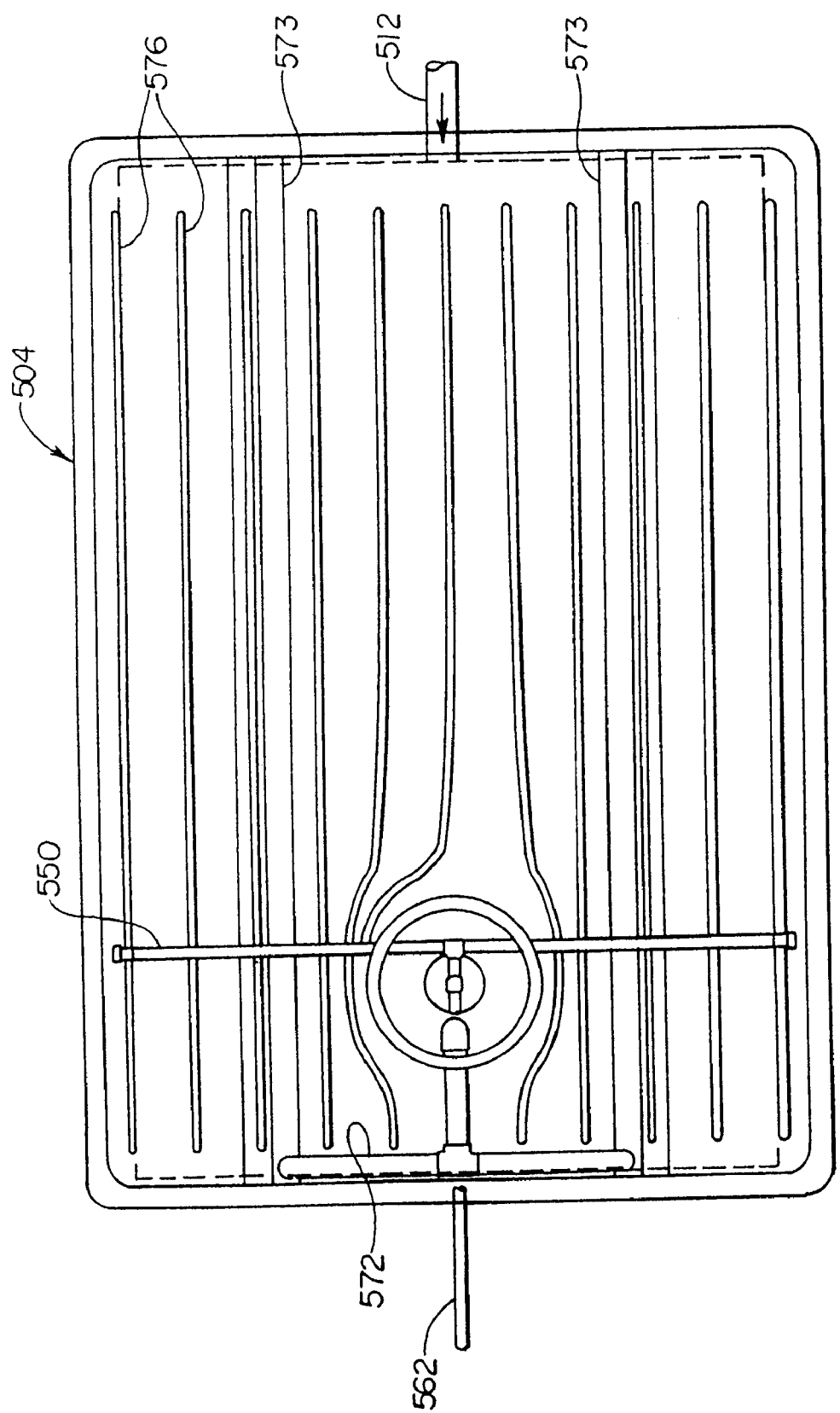
FIG. 20 is a plan view of the vertical flow wetland unit of FIG. 17, depicting a portion of the wastewater supply system thereof.

The vertical flow wetland unit 504 may include a tank 570. The tank 570 may be a self-contained, substantially impermeable structure made of such materials as fiberglass. However, several embodiments, such as the structures disclosed above with respect to the vertical flow wetland 408 may also be used. A drain return 572 receives treated wastewater from upper drains 573 (FIGS. 18 and 19). A bed medium 574 is disposed about, and overlays, the drain return 572 and upper drains 573. Of course, the bed medium may also include two or more types of bed media as discussed above with respect to the disposal system 400. An interconnected series of distribution tubes 576 extends from the outlet 550. One or more of these distribution tubes 576 may terminate in a return line 577. The distribution tubes 576 are generally disposed atop the bed medium 574. The return lines 577 generally extend through the bed medium 574, returning effluent into the recirculating chamber 516, e.g., via returns 564. A mulch layer 578 overlays the distribution tubes 576 and bed medium 574 in this embodiment. Vegetation 580 is rooted in the bed medium 574 and grows through the mulch layer 578. The mulch layer 578 may be substantially similar to the substantially decomposed mulch layers disclosed hereinabove. The vegetation 580 may include plant species of previously discussed embodiments, but may also include species which are less tolerant of saturated bed media.

The air injector 546 is an alternate embodiment of a forced air source and constitutes yet another method of oxygenating wastewater being treated by the present system. The recirculating pump 540 and/or air injector 546 may be used in lieu of pump 428 of system 400 as well. One suitable recirculating pump is J10BE, available from Hydromatic, Inc. One suitable air injector is disclosed in U.S. Pat. No. 4,123,800, issued Oct. 31, 1978 to Mazzei, the entire disclosure of which is above incorporated by reference. The oxygenated wastewater promotes aerobic bacterial activity to more efficiently decompose pollutant compounds.

The solenoid valve 560 is an alternate method of transferring treated wastewater from the present recirculation chamber to a disposal system (e.g., disposal system 412). The solenoid valve 560 may be controlled by a float switch (not shown). For example, the float switch may actuate the solenoid 560 to open a valve allowing treated wastewater to be pumped from the recirculation chamber 516 to a disposal site when a wastewater level 588 is attained. Once the wastewater level has dropped to a low level 590, the float switch closes the valve and wastewater recirculation to the vertical flow wetland unit 504 recommences. Alternatively, the disposal return 564 and/or drain 572 may convey the treated wastewater directly to a disposal field or other site for disposal.

The recirculation pump 540 may be actuated from a timer switch (not shown) to better adjust the flow of wastewater being treated. Continuous recirculation is also possible, but may not always be desirable. Typically, the recirculation pump timer is used so that a flow of approximately 5 to 20 times the throughput flow is recirculated on a daily basis. One method of regulating recirculation and output flow is described above with respect to the logic unit L.

The distribution tube 576 may include a row of apertures 594, typically ¼ inch in diameter and spaced apart about three feet. Alternatively, a drip emitter as disclosed above may be used. The return lines 577 enable a portion of the oxygenated flow pumped into the distribution tube 576 to be directed back to the recirculating chamber 516 rather than being directed through the vertical flow wetland unit 504 as an alternate method of adjusting oxygen concentrations within the wastewater contained within the recirculation chamber 516. The upper drain pipes 573 collect flow of treated wastewater from the bottom of the basin formed by the tank 570 and return the flow back to the recirculating chamber 516. In one embodiment, the upper drains 573 are generally triangular in cross section and may be cast unitarily with the tank 570. However, perforated pipes, 2 to 4 inches in diameter, may be used as upper drains 573 as well. Any or all of the present recirculating pump, valves, lines, and distribution tubes are arbitrarily contemplated to be included in the wastewater supply system 432. The wastewater return system 475 may include structures for conveying treated wastewater from the wetland cell 504, such as the drain return 572 and disposal return 564.

Another alternate embodiment of the present intervention is depicted at 600 in FIG. 31 and is operably installed in a soil profile. However, free standing embodiments which are not disposed in a soil profile may be desirable in some situations. The system 600 incorporates many of the features of the embodiment discussed above with respect to FIGS. 14, 15, and 16*a–c* into a single, integrated, easily installed unit. The wastewater treating system 600 includes a tank 602 and a vertical flow wetland unit 604. An inlet 610 (e.g., 4 inch diameter, schedule 40 PVC) empties into the tank 602. The inlet 610 may be fluidly connected to a settling tank, such as a septic tank, wherein solids are settled out of the exogenous wastewater before the wastewater enters the wastewater treating system 600. The tank 602 has a partition 612, which separates a first reservoir, such as a septic chamber 614, and a second reservoir, such as a pumping chamber 616. The septic chamber 614 and the pumping chamber 616 are in fluid communication via an opening 618. However, the septic and pumping chambers 614 and 616 could be completely separate structures as well. The inlet 610 opens into a canister 622. A filter container 624 contains a filter 626 and a handle 628 extends from the filter 626. The handle 628 allows the filter 626 to be removed for cleaning or replacement. A first riser 630 allows access to the septic chamber 614 and is disposed above the canister 622. A second riser 632 allows access to the septic chamber 614 and the pumping chamber 616. The second riser 632 is disposed over the filter holder 624. A third riser 634 allows access to the pumping chamber 616. Covers 636, 638, and 640 cover respective risers 630, 632, and 634.

The tank 602 is substantially impermeable to liquids, so that the wastewater within will not seep into the soil profile from the tank 602 before being treated. The tank 602 may be constructed from impervious materials (e.g., fiber glass) or, alternatively, may be constructed from materials which are not impervious (e.g., cement), then coated with a substance to impart impermeability (e.g., bituminous coating).

The canister 622 is open at a top 642 thereof or is otherwise constructed to readily admit liquids from the vertical flow wetland unit 604 as more fully described below. One suitable embodiment of the canister 622 is a wire basket. The canister 622 contains a mixing device 644 (not shown) which readily allows liquids to pass therethrough, but with a large surface area to provide fluid mixing and a habitat on which anaerobic or anoxic microorganisms can function to denitrify the wastewater. The canister 622 also includes a bottom portion 646 with at least one, preferably a plurality of, opening(s) 648 (not shown). Suitable devices 644 for these purposes have surface areas of greater than about 15 square feet per cubic foot of volume, between about 15 and 85 square feet per cubic foot of volume, between about 38 and 85 square feet per cubic foot of volume, or any range subsumed therein. These mixing devices may be made from injection molded resins such as polypropylene, PVC, KYNAR®, Halar®, Teflon® and glass-filled polypropylene. One suitable embodiment includes vertically disposed, bundled PVC tubing. Other suitable embodiments are sold as Tri-Packs® and are available from Tri-Mer® Corporation, Owosso, Mich. The filter 626 may use a stacked plate, brush fiber, or pleated (or similar) media capable of filtering particulate matter from the combined wastewater and recirculation flow. One suitable embodiment of the filter 626 is designated Model A-300 HIP and is available from Jabel Environmental Technology, Crestwood, Ky.

Figure 17:
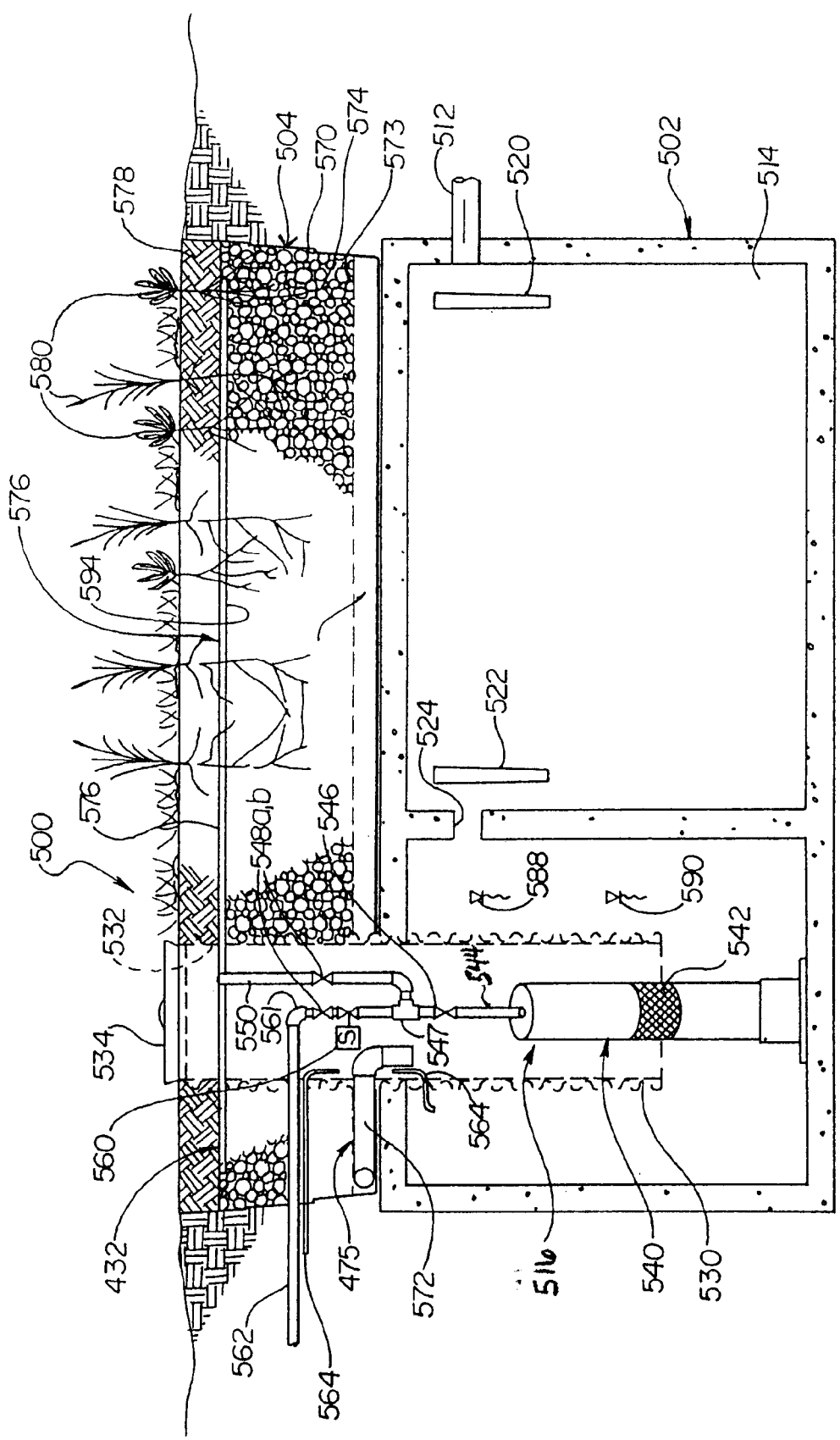
FIG. 17 is a cross-section depicting another embodiment of a vertical flow wetland cell disposed atop a tank with a settling compartment and a recirculation compartment.

Within the pumping chamber 616 is a circulating pump 650 disposed on a stand 651. The pump 650 is configured to pump fluids through a pipe 652. The pipe 652 is joined to an optional air injector 654 at a joint 656. The air injector 654, in turn, is joined to a three-way ball valve 658 at a joint 660. The three-way ball valve 658 is operated by an actuator 662. A series of pipe sections 664, 666, and 668 and joints 670, 672, and 674 connect the three-way ball valve 658 to a distribution tube, such as distribution tube 576 (FIG. 17). A of series pipe sections 676, 678, and 680 and joints 682, 684, 686, and 688 fluidly communicate the three-way ball valve 658 to an outlet 690. An optional rope 692 is attached to a lifting handle 694 on the pump 650. The rope 692 may be used to remove the pump 650 for repair or replacement. Optional and respective pressure gauges 696, 698, and 700 monitor fluid pressure in the pipe 652 and joints 674 and 682 when the pump 650 is operating. The pressure gauges 696, 698, and 700, if present, may also be use for quantifying the airflow from the air injector 654. Readings (sensings) from the pressure gauges may be relayed to the logical unit L (not shown) to control under what conditions the pump 650 will be actuated. In one embodiment, the pump 650 is a 0.5 horsepower, 230 volt, single face pump with a capacity of 20 (+/−5) gallons per minute when pumping fluids to the vertical flow wetland unit 604 and 17 (+/−5) gallons per minute when pumping fluids to the outlet 690. One suitable embodiment of the air injector 654 is disclosed in U.S. Pat. No. 4,123, 800, previously incorporated by reference.

Figure 21:
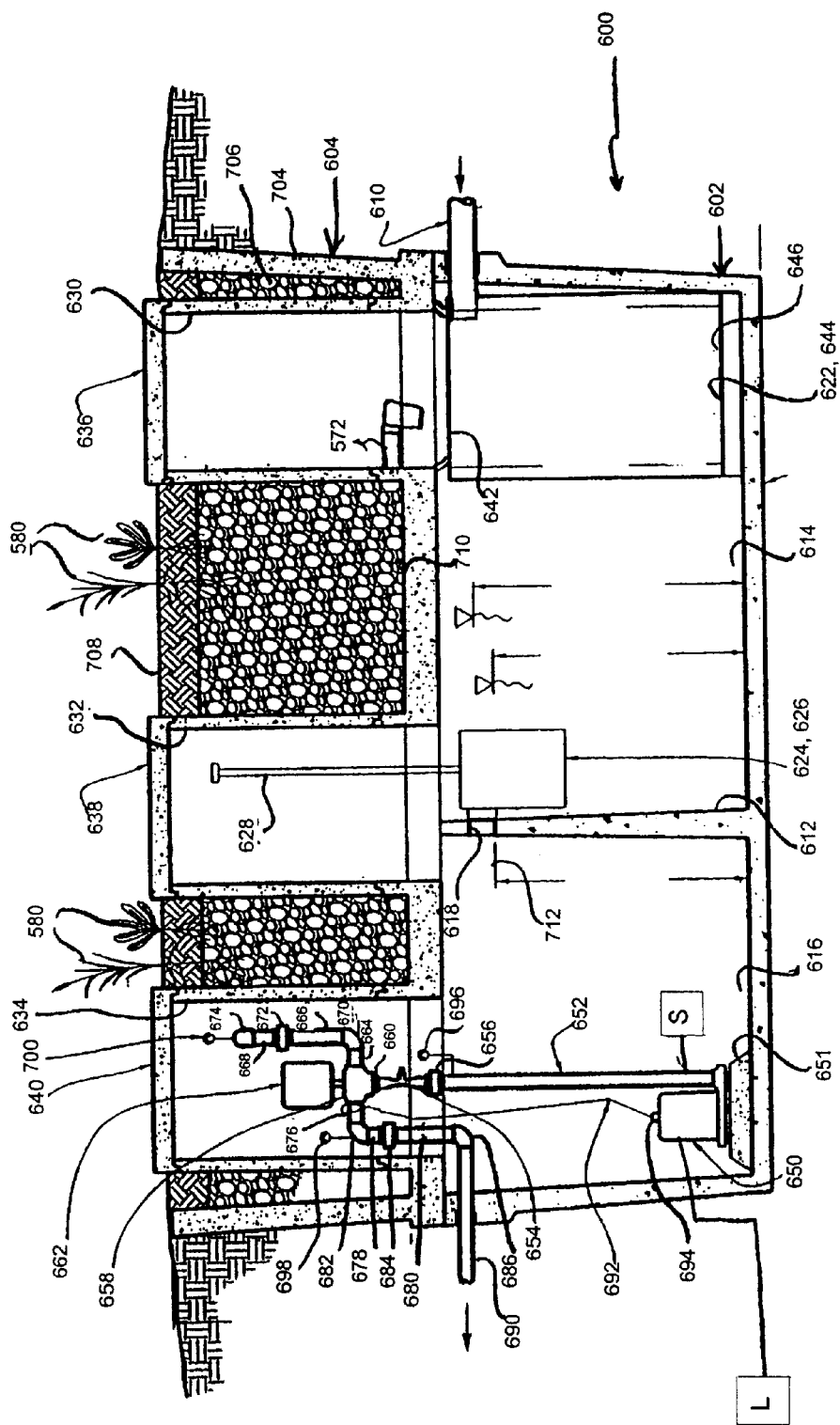
FIG. 21 is a cross-section depicting yet another embodiment of a vertical flow wetland cell disposed atop an aerobic unit.

Except for the presence of the risers 630, 632, and 634, the vertical flow wetland unit 604 may be identical, or substantially similar, to the vertical flow wetland unit 504 described above. In the embodiment depicted in FIG. 21, the vertical flow wetland unit 604 includes a tank 704, which contains a bed medium 706. The bed medium 706 may be substantially similar to the bed media discussed above with respect to FIG. 3 or 15. A mulch layer 708 and vegetation 580 may also be optionally present. The mulch layer 708 is disposed over the bed medium 706. In this embodiment, the mulch layer includes a substantially decomposed substance such as peat moss. The vegetation 580 may be rooted in the bed medium 706 and grows through the mulch layer 708. A wastewater supply system, such as the system described above with respect to FIGS. 17–20, may present to convey wastewater from the joint 674 to an upper portion of the bed medium 706. The wastewater supply system may comprise vessels similar to outlet line 550 and distribution tubes 576. After being vertically conveyed through the bed medium 706, the wastewater is returned to the tank 602 by a wastewater return system, such as the drain return 572 and upper drains 573. In an alternative embodiment, a solenoid directs the treated wastewater to an outlet rather than to the septic chamber (not shown). The drain return 572 empties into the canister 622. The wastewater return system may also include return lines 577, which cycle wastewater directly from the wastewater supply system without delivering the wastewater to the upper portion of the bed medium for aerobic treatment. Optionally a floor 710 of the present vertical flow wetland unit may be sloped so that, after the wastewater trickles through the bed medium 706 to the floor 710, the wastewater flows into the septic chamber 614 by force of gravity via an opening (not shown) in the riser 630 or another opening at an appropriate location.

In operation, water from the septic tank is delivered into the canister 622 via the inlet 610. When the pump 650 is operating, wastewater is delivered into the canister 622 e.g., via the return 572, after dripping through the bed medium 706. The canister 622 admits the nitrified wastewater from the vertical flow wetland unit 604. When conveyed to the canister 622, the two wastewater streams are mixed in the device 644. The mixing device 644 may be considered to provide a subzone in which the nitrified wastewater from the vertical flow wetland unit 604 and the incoming wastewater, e.g., from a septic tank, are mixed. The carbon source for denitrification within the septic chamber 614 and the pumping chamber 616 is provided by the wastewater from the septic tank. Moreover, mixing the two wastewater streams lowers the dissolved oxygen concentration and the redox potential of the final mixed wastewater to anaerobic or anoxic levels to thereby allow for wastewater denitrification in the tank 602. The co-mingled wastewater streams from the septic tank and vertical flow wetland unit 604 then flow through the device 644 and exit the device 644 through the openings 648. The device 644 has a large surface area to promote fluid mixing and provide habitat for bacterial (microbial) denitrification therewithin. Previous experience has indicated that the filter 626 must be cleaned or replaced approximately every third month in the absence of the device 644. Cleaning the filter 626 was likely necessitated by clogging due to growth of denitrifying bacteria within the filter 626. Using the device 644 has reduced the frequency of cleanings required to maintain the filter 626, often to intervals of 12 months, or longer. Within the tank 602 the mixed wastewater undergoes denitrification. The mixed wastewater then enters the pumping chamber 616 through the opening 618, after passing through the filter 626. The filter 626 prevents solids from entering the pumping chamber 616. The solids may have originated from the vertical flow wetland unit 604 or the septic tank. The filter 626 also provides additional surface area (habitat) for denitrifying bacterial growth and development.

Upon entering the pumping chamber 616, the wastewater is still essentially anaerobic (or anoxic) and undergoes further denitrification. The pump 650 pumps the wastewater from the pumping chamber 616 through pipe 652 and air injector 654. In the absence of the air injector 654, sufficient aeration to aerobically lower BOD may occur when the wastewater is being dripped through the bed media layer in a substantially vertical and unsaturated flow and/or from an aerator disposed just upstream of where the wastewater is being delivered to the upper portion of the present bed medium layer (as described above with respect to FIG. 14). The air injector 654 injects air (oxygen) into the wastewater being pumped therethrough. The actuator 662 directs the wastewater stream from the air injector 654 either to the vertical flow wetland unit 604 or the outlet 690. While trickling through the bed medium 706 of the vertical flow wetland unit 604 in an unsaturated flow, the wastewater undergoes aerobic treatment, wherein BOD is reduced by aerobic microorganisms. The actuator 662 may be float-operated. If float-operated, the wastewater is conveyed to the vertical flow wetland unit 604 when the wastewater is below a specified wastewater level 712. When the wastewater is above the level 712, the actuator 662 and wastewater are pumped to the outlet 690, e.g., to a drain/absorption field in an adjacent soil profile. Alternatively, a controller logic unit L (described above) and/or a sensor S can be used. The sensor S senses the oxygen concentration of the wastewater in the pumping chamber 616. If the oxygen concentration is above a predetermined level, the valve 662 would direct the wastewater to the outlet 690. If the oxygen concentration of the wastewater in the pumping chamber was below the predetermined level, the valve 662 would direct the wastewater to the present vertical flow wetland unit 604 to be further treated aerobically.

While the invention has been described in conjunction with specific embodiments thereof, it is evident that many alternatives, modifications and variations will be apparent to those skilled in the art in light of the foregoing description. Accordingly, it is intended to embrace all such alternatives, modifications, and variations as fall within the spirit and broad scope of the invention.

What is claimed is:

1. A constructed system for treating wastewater, comprising:

an inlet admitting wastewater into the system;

an outlet conveying treated wastewater from the system;

a bed medium;

a wastewater supply configured to deliver the wastewater proximate an upper portion of the bed medium and comprising a first reservoir, a second reservoir, and a pump, the pump conveying wastewater from the second reservoir to the upper portion of the bed medium, the first reservoir in fluid communication with the second reservoir and receiving wastewater from the wastewater return, the first reservoir accommodating the inlet and comprising a mixing device for mixing wastewater from the wastewater return and wastewater from the inlet; and a wastewater return, at least a portion of the wastewater return disposed proximate a lower portion of the bed medium, the wastewater forming a substantially vertical and unsaturated flow from the wastewater supply through at least a portion of the bed medium, the wastewater subsequently conveyed from the bed medium by the wastewater return.

2. The constructed system of claim 1, the device for mixing wastewater characterized by a mixing device volume and including a structure with a surface area greater than about fifteen times the mixing device volume.

3. The constructed system of claim 1, further comprising a mulch layer overlaying the bed medium.

4. The constructed system of claim 1, further comprising a multiplicity of plants rooted in the bed medium.

5. The constructed system of claim 1, further comprising a mulch layer overlaying the bed medium and a multiplicity of plants rooted in the bed medium and extending through the mulch layer.

6. The constructed system of claim 5, in which the mulch layer is substantially decomposed.

7. The constructed system of claim 1, the bed medium comprising gravel.

8. The constructed system of claim 1, the wastewater supply further comprising an aerator for oxygenating the wastewater.

9. The constructed system of claim 8, in which the aerator is positioned to oxygenate the wastewater before the wastewater is conveyed to the bed medium.

10. A constructed wetland for treating wastewater, comprising:
- a vertical flow unit comprising a granular bed medium; and
- a substantially impermeable anaerobic wastewater container with an inlet and an outlet;
- means for mixing a stream of wastewater from the vertical flow unit with a stream of wastewater from the inlet; and
- a pump for conveying the wastewater from the wastewater container to an upper portion of the vertical flow unit.

11. The constructed wetland of claim 10, the vertical flow unit further comprising vegetation rooted in the bed medium.

12. The constructed wetland of claim 10, the vertical flow unit further comprising a substantially decomposed mulch layer overlaying the bed medium.

13. The constructed wetland of claim 10, the vertical flow unit further comprising a substantially decomposed mulch layer overlaying the bed medium and vegetation rooted in the bed medium and extending through the mulch layer.

14. The constructed wetland of claim 10, the wastewater container comprising a first reservoir accommodating the inlet and a second reservoir, the first and second reservoirs in fluid communication.

15. The constructed wetland of claim 10, the mixing means comprising a device characterized by a device surface area and a device volume, the device surface area at least about 15 square feet per cubic foot of device volume.

16. The constructed wetland of claim 10, further comprising an aerator for oxygenating the wastewater prior to conveying the wastewater to the upper portion of the vertical flow unit.

17. A system for treating wastewater, comprising:
- a constructed wetland cell comprising a bed medium, a wastewater supply, a wastewater return, and a multiplicity of plants rooted in the bed medium, at least a portion of the wastewater supply disposed proximate an upper portion of the bed medium, at least a portion of the wastewater return disposed proximate a lower portion of the bed medium such that the wastewater is conveyed from the wastewater supply through the bed medium in a substantially vertical, unsaturated flow;
- an air supply system for increasing oxygen concentration in the wastewater before the wastewater is conveyed to the wetland cell;
- a first tank containing a first filter for mixing wastewater from the wetland cell and exogenous wastewater and for denitrifying wastewater in the first tank; and
- a second tank configured for receiving wastewater from the first tank, the second tank with a pump for pumping wastewater to the wastewater supply.

18. The system of claim 17, further comprising a canister housing the first filter, the canister with an upper portion and a lower portion, the upper portion defining an upper portion opening and the lower portion defining a lower portion opening.

19. The system of claim 18, in which the canister is a wire basket.

20. The system of claim 17, further comprising a second filter disposed between the first tank and the second tank and configured to remove solids from wastewater being conveyed from the first tank to the second tank.

21. The system of claim 17, further comprising an inlet and an outlet, the inlet positioned to convey exogenous wastewater to the first tank, the outlet positioned to convey treated wastewater from said system.

22. A process for treating wastewater in a constructed wastewater treatment system comprising a constructed wetland unit, a wastewater supply system, a wastewater return system, and a substantially impervious container, the constructed wetland unit comprising a substantially impervious tank and a granular bed medium disposed in the wetland unit tank, the container with an outlet, an inlet, and a mixing device, the wastewater supply system delivering wastewater to an upper portion of the bed medium, the wastewater return system delivering wastewater from proximate a lower portion of the bed medium to the container, the process comprising:
- conveying the wastewater through the wastewater supply system from the container to the upper portion of the bed medium;
- trickling the aerated wastewater through a portion of the bed medium in a substantially vertical and unsaturated flow to the lower portion of the bed medium; and
- mixing the wastewater from the constructed wetland unit with wastewater entering the impervious container from the inlet.

23. The process of claim 22, the wastewater treatment system further comprising an aerator functionally proximate the wastewater supply system, and
- in which the aerator aerates the wastewater as the wastewater is conveyed through the wastewater supply from the container to the upper portion of the bed medium.

24. The process of claim 23 in which the wastewater is aerated in the wastewater system before the wastewater is conveyed to the upper portion of the bed medium.

25. The process of claim 22, in which the wastewater is aerobic or anoxic after being mixed by the mixing device.

26. The process of claim 22, the container comprising a first reservoir, the mixing device disposed in the first reservoir, and
- in which the wastewater is mixed in the first reservoir.

27. The process of claim 26, in which the wastewater is anoxic or anaerobic after being mixed in the first reservoir.

28. The process of claim 26, the container further comprising a second reservoir, the first reservoir in fluid communication with the second reservoir, the wastewater flowing from the first reservoir to the second reservoir after being mixed.

29. The process of claim 28, in which the wastewater is anoxic or anaerobic when present in the second reservoir.

30. The process of claim 28, the container further comprising a partition separating the first and second reservoirs and defining a partition opening fluidly communicating the first and second reservoirs, and
- in which the wastewater flows from the first reservoir to the second reservoir through the partition opening.

31. The process of claim 30, the container further comprising a filter disposed in the first reservoir proximate the partition opening, and in which solids are filtered out of the wastewater by the filter.

32. The process of claim 28, the wastewater supply system further comprising a pump disposed in the second reservoir, and in which the wastewater is conveyed from the container to the upper portion of the bed medium by the pump.

33. The process of claim 32, further comprising conveying wastewater from the second reservoir.

34. The process of claim 33 in which the wastewater is conveyed from the second reservoir by the pump.

35. The process of claim 22, in which the mixing device is characterized by a mixing device surface area and a mixing device volume, the mixing device surface area at least about 15 square feet per cubic foot of mixing device volume, and in which the wastewater is at least partly denitrified by microorganisms disposed proximate the mixing device surface area.

* * * * *